United States Patent [19]

Dolikian

[11] Patent Number: 4,554,542
[45] Date of Patent: Nov. 19, 1985

[54] GUARD TONE CAPTURE METHOD
[75] Inventor: Arman V. Dolikian, Palatine, Ill.
[73] Assignee: Motorola, Inc., Rolling Meadows, Ill.
[21] Appl. No.: 448,457
[22] Filed: Dec. 10, 1982
[51] Int. Cl.[4] .......................... H04B 1/16; H04Q 1/38
[52] U.S. Cl. ................................. 340/825.76; 455/36; 340/825.77
[58] Field of Search ...................... 340/825.76, 825.77; 455/36, 343

[56] References Cited

U.S. PATENT DOCUMENTS

| | | | |
|---|---|---|---|
| 3,341,816 | 9/1967 | Davis et al. | 340/172 |
| 3,506,967 | 4/1970 | Foley | 340/172 |
| 3,544,983 | 12/1970 | Wallace, Jr. et al. | 340/213 |
| 3,577,080 | 5/1971 | Cannahe | 325/183 |
| 3,704,447 | 11/1972 | Reader et al. | 340/172 |
| 4,385,398 | 5/1983 | Wycoff et al. | 455/36 |

*Primary Examiner*—Donald J. Yusko
*Attorney, Agent, or Firm*—Edward M. Roney; Donald B. Southard

[57] ABSTRACT

A decoder for receiving and decoding a coded signal includes a particular frequency $f_o$ with a first and second amplitude. The first amplitude of the frequency $f_o$ is associated with the end of a first coded message while the second amplitude of the frequency $f_o$ is associated with the beginning of a second coded message. The decoder includes a receiver for receiving the coded signal, a tone detector circuit for detecting the frequency $f_o$, a level sensor responsive to the receiver output, a function block for performing a command and a control unit responsive to the tone detector circuit and the sensor means. The tone detector and control unit operate in one of at least two possible states. In the first state the control unit causes the tone detector to respond to the first amplitude of the frequency $f_o$. When the level sensor senses the second amplitude of the frequency $f_o$ the control unit responds by placing the tone detector circuit into its second state. In its second state, the tone detector circuit detects whether the level sensor was tripped by the frequency $f_o$ or by some other frequency. If the tone detector circuit detects the frequency $f_o$, the control unit causes the decoder to end its decoding of the first message and begin the decoding of a second message. If the tone detector circuit in its second state fails to detect the frequency $f_o$, the control unit returns the tone detector circuit to its first state so it may continue to decode the first amplitude of the frequency $f_o$ associated with the first coded message.

14 Claims, 14 Drawing Figures

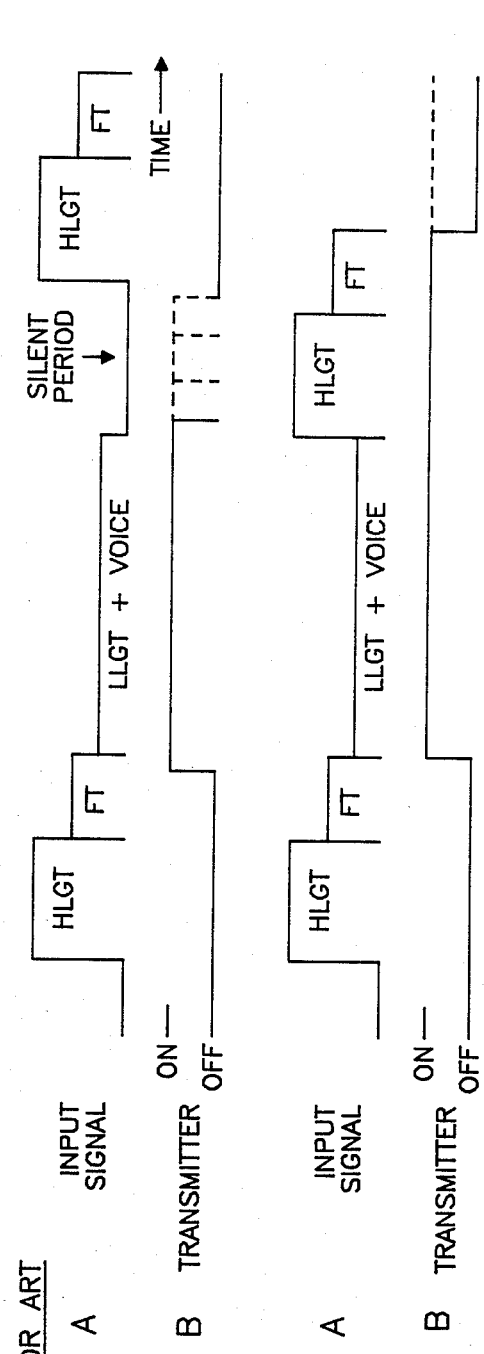
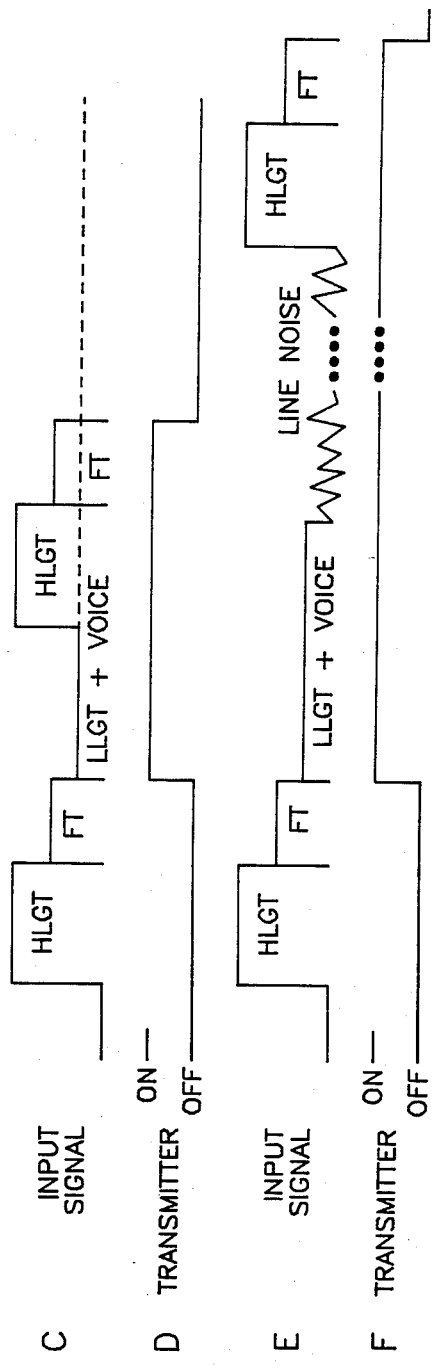
Fig. 1 PRIOR ART
Fig. 2

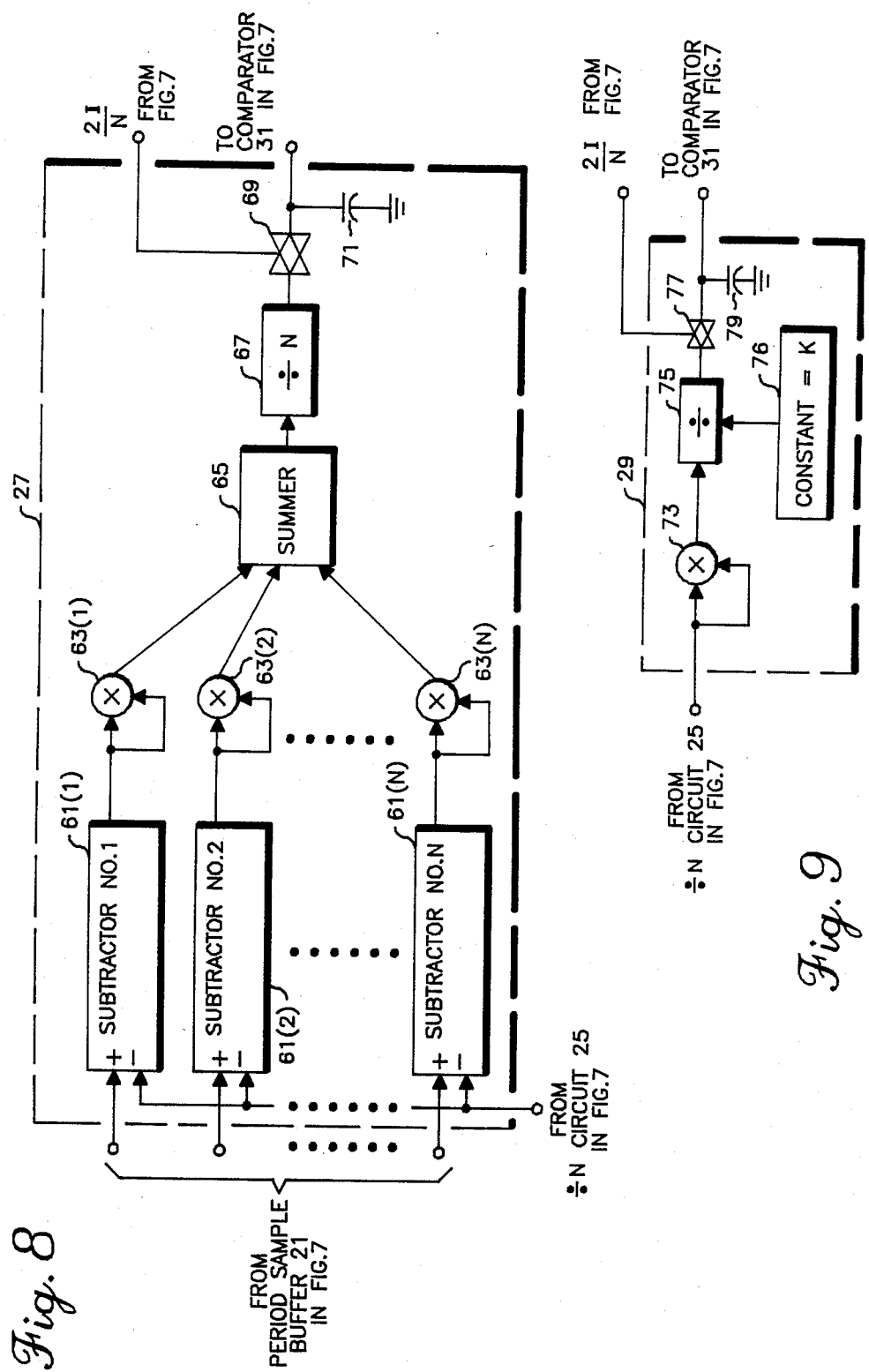

GUARD TONE CAPTURE METHOD

BACKGROUND OF THE INVENTION

The invention relates to improvement in signalling protocol between a base station transmitter site and a remote dispatch terminal. In particular, the invention relates to an improvement in the tone remote control of signalling scheme described in U.S. Pat. No. 3,577,080 to Cannalte. The invention is related to U.S. Pat. No. 4,455,617 issued 6/19/84 and U.S. Pat. No. 4,433,256 issued 2/21/84.

In Cannalte when a remote dispatch terminal wants to key its associated base station transmitter, it generates a two tone sequence consisting of high level "guard" tone followed by a "function" tone. These tones are decoded at the base station causing the base station to respond by carrying out some particular task. Some of the "function" tones instruct the base station to key the transmitter. Usually a voice audio message from the remote dispatch terminal follows a tone which keys the transmitter. The signalling scheme described in U.S. Pat. No 3,577,080 to Cannalte has both a high level and a low level "guard" tone signal. Both "guard" tones are of the same frequency. A low level "guard" tone is sent simultaneously with a voice audio message. This low level "guard" tone is decoded by the base station and used to determine the duration of the voice audio. When the voice audio is complete, both the voice and the lowlevel "guard" tone are discontinued. When the detector at the base station senses the absence of the low level "guard" tone, the transmitter is deactivated or dekeyed and thereby made ready for the next command from the remote dispatch terminal. Since the "guard" tone is a single frequency, the decoder for the tone consists primarily of a high quality factor filter. Because of the high quality factor the decoder reacts relatively slowly when the "guard" tone frequency is discontinued. Due to the high quality factor characteristics of the low level "guard" tone decoder, approximately 100 to 500 milliseconds of silence are required at the end of a transmission from the remote dispatch terminal before a new message transmission begins. This dead time or silence is necessary in order to insure the high quality factor decoder has sufficient time to respond to the discontinuation of the low level "guard" tone.

Under noisy input line conditions, the ordinary 100 to 500 milliseconds of silence at the end of a transmission from the remote dispatch terminal has been known to increase substantially since the low level "guard" tone detector mistakes line noise as a valid signal. The low level "guard" tone is of relatively low amplitude and as such the associated decoder at the base station transmitter site is particularly sensitive to noise. Accordingly, a noisy input line together with the high quality factor nature of the "guard" tone decoder often causes the decoder to continue indicating to the base station circuitry that a low level "guard" tone is present after the remote dispatch terminal has discontinued the low level "guard" tone. The result is that the transmitter remains activated after a message transmission has completed. The base station circuitry will not allow the transmitter to dekey and return the base station to a condition that is ready to receive a new message transmission. Since the low level and high level "guard" tones are at the same audio frequency, the base station transmitter decoder is unable to distinguish between the two signals. The base station can only discriminate between high and low level "guard" tone by the tones position in the message transmission. Therefore, if the base station transmitter hangs up under a noisy input line condition, the base station ignores any high level guard tone sent by the remote dispatch terminal since the state of the base station circuitry is such that it senses the high level "guard" tone signal only as a strong low level "guard" tone.

Currently, in the Cannalte signaling scheme the remote dispatch terminal must wait 500 milliseconds between messages in order to insure that a second message will be properly received. When line conditions are particularly noisy, even this 500 millisecond wait is sometimes not long enough. Base station transmitters have been known to hang up indefinitely under high input noise conditions requiring service technicians to actually visit the base station site in order to dekey the transmitter. In addition, the silent period required between message transmissions is dead air time that slows down the system throughput and is especially burdensome in high speed data systems. Also, when there is more than one remote dispatch terminal for a base station transmitter (parallel consoles), there is no inherent mechanism for a supervisor station to override and take over control of the transmitter by sending a command to dekey the station.

Therefore, the object of the invention is to provide a mechanism to sense the presence of high level "guard" tone under condition in which the signalling scheme calls for the base station to be detecting low level "guard" tone.

It is a further object of this invention to provide a way to dekey the transmitter when the base station appears to be hung up either by line noise or by parallel console failure or misuse.

It is another object of this invention to totally eliminate the silent time following each transmission from a remote dispatch terminal so that a series of messages can be sent immediately following one another.

BRIEF DESCRIPTION OF THE DRAWINGS

FIGS. 1a and 2b is a prior art time diagram of the signalling scheme for a radio communications link between a remote terminal and a transmitter site.

FIGS. 2a and 2b are time diagrams of the signaling pattern and transmitter on/off state for a decoder transition from a end of a first message to a beginning of a second message.

FIGS. 2c and 2d are time diagrams of the signaling pattern and transmitter on/off state for a decoder transition from an interrupted first message to a beginning of a second message.

FIGS. 2e and 2f are time diagrams of the signaling pattern and transmitter on/off state for a decoder transition from a "hang-up" condition to a dekeyed condition.

FIG. 8 is a circuit diagram of the variance calculator block of FIG. 7.

FIG. 9 is a circuit diagram of the variance reference threshold block of FIG. 7.

SUMMARY OF THE INVENTION

Figure 3:
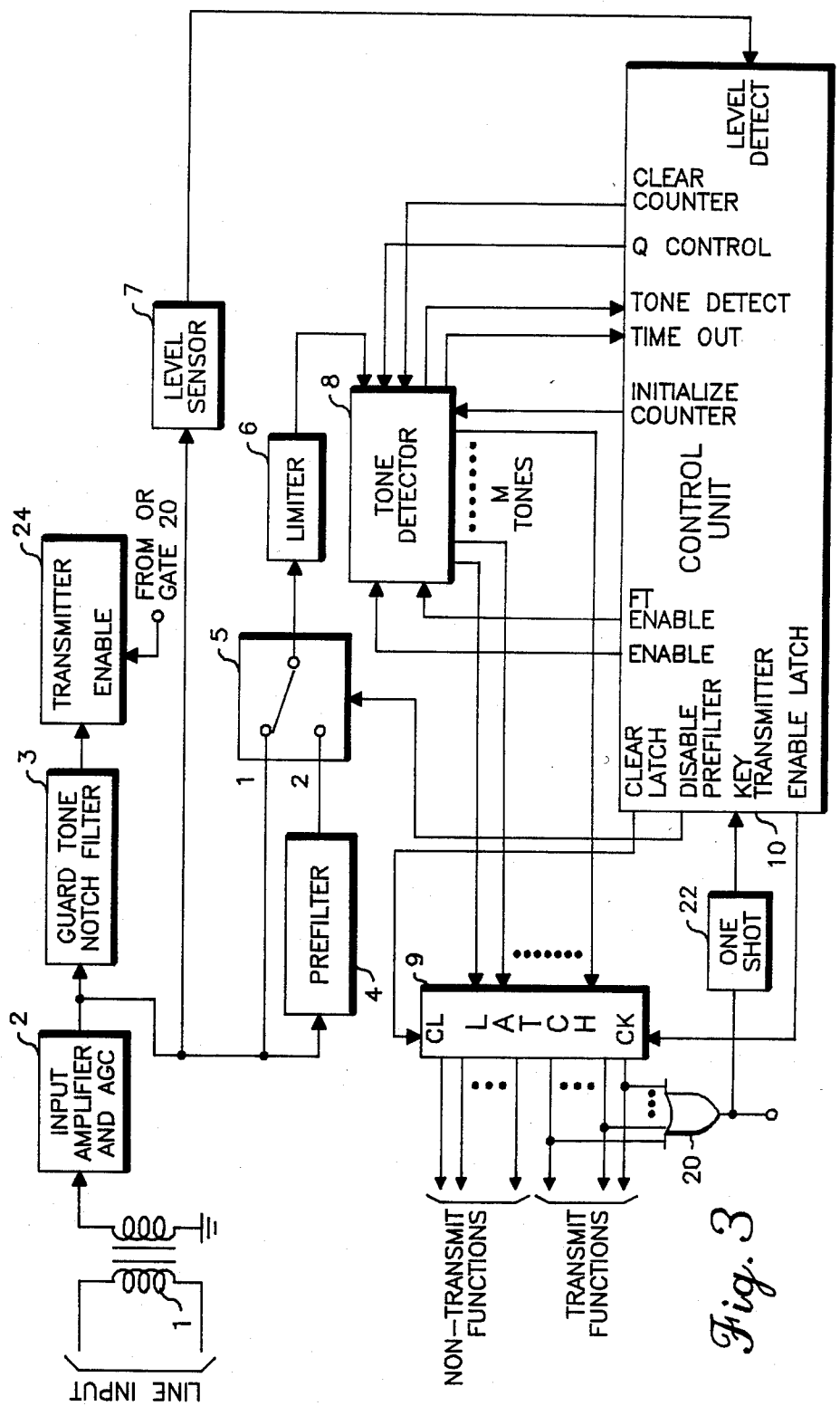
FIG. 3 is a block diagram of the transmitter site decoder according to the invention.

Briefly, the invention is a decoder for receiving and decoding a coded signal which includes a particular frequency $f_o$ with a first and second amplitude. The first amplitude of the frequency $f_o$ is associated with the end of a first coded message while the second amplitude of the frequency $f_o$ is associated with the beginning of a second coded message. The decoder includes a receiver for receiving the coded signal, a tone detector circuit for detecting the frequency $f_o$, a level sensor responsive to the receiver output, a function block for performing a command and a control unit responsive to the tone detector circuit and the sensor means. The tone detector and control unit operate in one of at least two possible states. In the first state the control unit causes the tone detector to respond to the first amplitude of the frequency $f_o$. When the level sensor senses the second amplitude of the frequency $f_o$ the control unit responds by placing the tone detector circuit into its second state. In its second state, the tone detector circuit detects whether the level sensor was tripped by the frequency $f_o$ or by some other frequency. If the tone detector circuit detects the frequency $f_o$, the control unit causes the decoder to end its decoding of the first message and begin the decoding of a second message. If the tone detector circuit in its second state fails to detect the frequency $f_o$, the control unit returns the tone detector circuit to its first state so it may continue to decode the first amplitude of the frequency $f_o$ associated with the first coded message.

DETAILED DESCRIPTION OF THE DRAWINGS

The System

FIG. 1a is the signaling scheme of the prior art communications link between a remote terminal and a transmitter site. The signaling scheme consists of audio tones in a time sequence. The first tone is called a high level guard tone (hereafter HLGT) which is always at a single frequency. The HLGT signal tells the decoder at the transmitter site to prepare for a command which is about to be given from the remote terminal. The command, which immediately follows the HLGT signal, is one of several possible audio tones. The tones are called function tones (FT) and each one represents to the decoder a command to perform a function. As an example, function tone number one may represent to the decoder circuitry a command to key the transmitter at a first carrier frequency. Function tone number two may represent a command to turn on the lights on the top of the transmitter tower. After a function tone which keys the transmitter is transmitted from the remote terminal, a audio voice is sent to the transmitter for broadcast. The audio voice is impressed with a low level guard tone (hereafter LLGT) at the remote terminal. The LLGT signal is of the same frequency as the HLGT signal. As their names imply, the HLGT signal is of a higher amplitude than the LLGT signal.

FIG. 1b shows the response of the prior art decoder to the transmitted signal when the particular function tone is a command to key the transmitter. The prior art decoder keys the transmitter in response to the function tone. After the function tone the LLGT is sensed by the prior art decoder which holds the transmitter in a keyed condition until the LLGT signal ends. The decoder delivers the audio voice signal, stripped of the LLGT signal, to the keyed transmitter. The transmitter remains keyed as long as the decoder continues to detect LLGT. Because of the high quality factor filter in the decoder which detects the LLGT signal the decoder requires a silent period after the LLGT ends before a new message can begin with a HLGT signal. If a HLGT signal is sent before the decoder has time to de-energize from its detection of a LLGT signal, there is a substantial possibility that the prior art decoder will interpret the HLGT signal as a strong LLGT signal. If this occurs the prior art decoder will ignore the function tone which follows the HLGT. As a result the command from the remote terminal will be lost.

FIGS. 2a through 2f are examples of how the decoder according to the invention allows a second message to follow immediately at the conclusion of the previous message. FIGS. 2a and 2b show that after the completion of a first message which included audio voice and. LLGT, there is no need to wait for a period of time before transmitting the second message. The decoder according to the invention will respond to a HLGT signal which immediately follows the end of a LLGT signal. FIG. 2b indicates that the transmitter will either turn off or continue in a keyed condition depending on the command given by the function tone. In the prior art the HLGT following the LLGT and voice would be interpreted by the decoder as more LLGT. Thus the command given by the function tone would be ignored. FIGS. 2c and 2d illustrate that the decoder according to the invention can also interrupt a audio message before it is completed. A command console can be used as a supervisory station for control of multiple parallel consoles and for emergency situations. A console can override the current user in an emergency situation. Therefore, if the user needs to perform a command at the base station, the parallel console currently sending LLGT and voice can be overridden. In the prior art there was no way to override the current user sending LLGT and voice. FIG. 2d shows that the second HLGT followed by FT can dekey the station even though the first console was still sending LLGT and voice. FIGS. 2e and 2f illustrate the inventions ability to dekey the base station transmitter if it "hangs up" under noisy input conditions. The prior art decoder has been known to decode noise as LLGT and therefore hold the transmitter keyed for an indefinite period. The decoder according to the invention can override the false LLGT signal to dekey the transmitter so the base station may execute a new message command.

FIG. 3 is a block diagram of the decoder according to the invention. The decoder is responsive to the signalling scheme, generally shown in FIGS. 1 and 2 and specifically explained in U.S. Pat. No. 3,577,080 to Cannalte. In the signalling scheme of the Cannalte patent and of FIGS. 1 and 2 herein a remote terminal first transmits over the audio channel a high level guard tone signal followed by a function tone signal which in turn is followed by voice audio inpressed over a low level guard tone signal. In FIG. 3 a line coupler 1 receives signals from a remote terminal by way of a audio channel. An input amplifier/automatic gain control circuit 2 prepares the input signal to be processed by the remainder of the decoder circuitry. The output signal from the input amplifier/AGC circuit 2 is processed through a guard tone notch filter 3 and sent on to the transmitter. The guard tone notch filter 3 removes any guard tone frequency from the input signal signal in a voice audio signal before the voice audio is transmitted.

The prefilter 4 is a low Q bandpass filter which also receives the output signal from input amplifier/AGC circuit 2. The prefilter 4 is a broad band filter which allows the guard tone to pass but attenuates noise, audio voice and function tone frequencies. An analog switch 5 enables a limiter circuit 6 to receive its input signal from the prefilter 4 or directly from the input amplifier/AGC circuit 2. The limiter circuit feeds its output to a tone detector 8. The limiter circuit 6 can be of conventional design. But preferrable it is constructed as shown in FIG. 13. A level sensor circuit 7, of well known and conventional design, receives its input signal from the input amplifier/AGC circuit 2. The output of the level sensor 7, as well as the output from the high Q guard tone detector 8, are delivered to a control unit 10 which responds to these signals to control the analog switch 5 and the tone detector 8. The tone detector 8 functions in two modes. In the first mode the tone detector 8 is enabled to detect guard tone frequency. When the control unit 10 activates its FT enable output the tone detector 8 responds by changing to a second mode to detect a plurality of function tone frequencies. The preferred embodiment of the tone detector 8 is described in detail in connection with FIGS. 7–12b.

In its initial condition the control unit 10 allows the analog switch 5 to contact its #2 input. A message begins with a high level guard tone. After the high level guard tone is received by the line coupler 1 and carried to the input amplifier/AGC circuit 2, it is fed to the prefilter 4. The guard tone frequency passes through the prefilter 4 and appears at the #2 input to the analog switch 5. The switch 5 passes the signal to the limiter 6. In the limiter 6, the signal is processed to be compatible with input to the tone detector 8. From the limiter 6 the high level guard tone passes to the input of tone detector 8. Initially the tone detector 8 is in its first mode to detect guard tone. The detection output from the tone detector 8 is delivered to the control unit 10. The control unit 10, in response to the reception of the detect signal from the tone detector 8, activates its FT enable output. This puts the tone detector 8 in its second mode in order to detect function tones. The control unit 10 also disables the prefilter 4 to allow the tone detector 8 to receive that portion of frequency spectrum which the function tones occupy. The prefilter 4 is disabled by the control unit 10 switching the analog switch from its #2 input to its #1 input.

As explained a function tone immediately follows the high level guard tone. The function tone is received by the base station through the line input 1 and delivered to the decoder circuitry through the input amplifier/AGC circuit 2. The tone detector 8 is enabled by the control unit 10 to detect function tones from the output of the limiter 6. The tone detector 8 has a parallel line output indicating which one of M tones the base station is receiving. If one of the M tones is detected the tone detector 8 outputs a tone detect signal to the control unit 10. If no recognized function tone is detected within a prescribed period of time, the tone detector 8 outputs a time out signal to the control unit 10. When the control unit 10 receives either a tone detect signal for a function tone or a time out signal the control unit 10 enables prefilter 4 by switching analog switch 5 back to its #2 input. Upon detection of the function tone the control unit 10 outputs an enable latch signal which clocks latch 9. Latch 9 stores the output of the tone detector 8 and transfers the information to the appropriate function circuitry. After detecting the function tone and storing it in the latch 9, the control unit 10 returns the tone detector 8 to its first mode or state for detection of guard tone. If the control unit 10 receives a time out signal from the tone detector 8, the control unit will return the decoder circuitry to a state ready to receive a new HLGT since the decoder failed to detect a function tone command.

Each function tone may command the base station to perform a plurality of functions. The function tones of particular interest in regard to the present invention are the function tones commanding the base station to key the transmitter. In the prior art a command which keyed the transmitter locked other parallel remote terminals out for the duration of the transmission. Sometimes the transmitter would stay keyed (hang-up) after the remote terminal user had stopped transmitting LLGT. In FIG. 3 the control unit 10 receives a key transmitter signal from the output of one shot 22. One shot 22 is responsive to a OR gate 20 which has as its inputs those function tones at the output of latch 9 which serve to key the transmitter. With the transmitter keyed the base station is ready to receive a voice audio for transmission. After the remote terminal has sent a function tone which keys the base station transmitter it immediately transmits the audio voice message impressed with a low level guard tone signal. At the base station the signal is received at the line coupler 1 and delivered through the input amplifier/AGC circuit 2 into the guard tone notch filter 3 where the low level guard tone frequency is filtered out of the audio voice signal. The voice audio is then delivered to the keyed transmitter for immediate transmission. The voice and low level guard tone are delivered to both the input of the level sensor 7 and the #2 input of analog switch 5. The control unit 10 delivers a initialize counter pulse to the tone detector 8 in order to avoid the possibility of tone detector 8 timing out before the LLGT signal has sufficient time to energize the tone detector 8 above its threshold level. The control unit 10 also changes the tone detector 8 to a high Q condition.

The level sensor 7 monitors the amplitude of the audio voice and the LLGT at the output of the input amplifier/AGC circuit 2 in order to detect HLGT which will indicate the start of a new message. If the level sensor 7 is triggered by a sufficient amplitude it produces a signal at the level detect input of the control unit 10. In response the control unit 10 activates the analog switch 5 to close the contact at its #1 input and bypass prefilter 4. Simultaneously the control unit 10 lowers the characteristic Q of the tone detector 8 by way of its Q control output. In addition the control unit 10 discharges the energy stored in the tone detector 8 by way of its clear counter output.

By disabling the prefilter 4 the limiter 6 receives the entire signal present at the output of the input amplifier/AGC circuit 2. By the nature of the construction of limiter 6, the dominating frequency at the output of the limiter 6 will be that signal with the greatest amplitude at its input. Therefore if the level sensor 7 triggers on a high amplitude audio voice signal the output of the limiter 6 would be a signal at approximately the frequency of the audio voice. If the level sensor 7 actually senses a HLGT the output of the limiter 6 would exhibit a characteristic frequency of guard tone frequency. The lower Q allows the tone detector 8 to respond more quickly and thereby indicate a detect signal to the control unit 10 in a relative short period of time. While the control unit 10 responds to a signal from level sensor 7 to disable the prefilter 4 and change the Q of the tone detector 8, the transmitter remains keyed and transmits the signal received from the remote terminal. Therefore, if the level sensor 7 falses on a high amplitude audio voice there is no interruption of the transmitted voice message. If the tone detector 8 fails to detect HLGT within a predetermined period of time, the control unit 10 will return the tone detector 8 to its higher effective Q, send a initialize counter pulse to the detector 8 and enable the prefilter 4.

Figure 4:
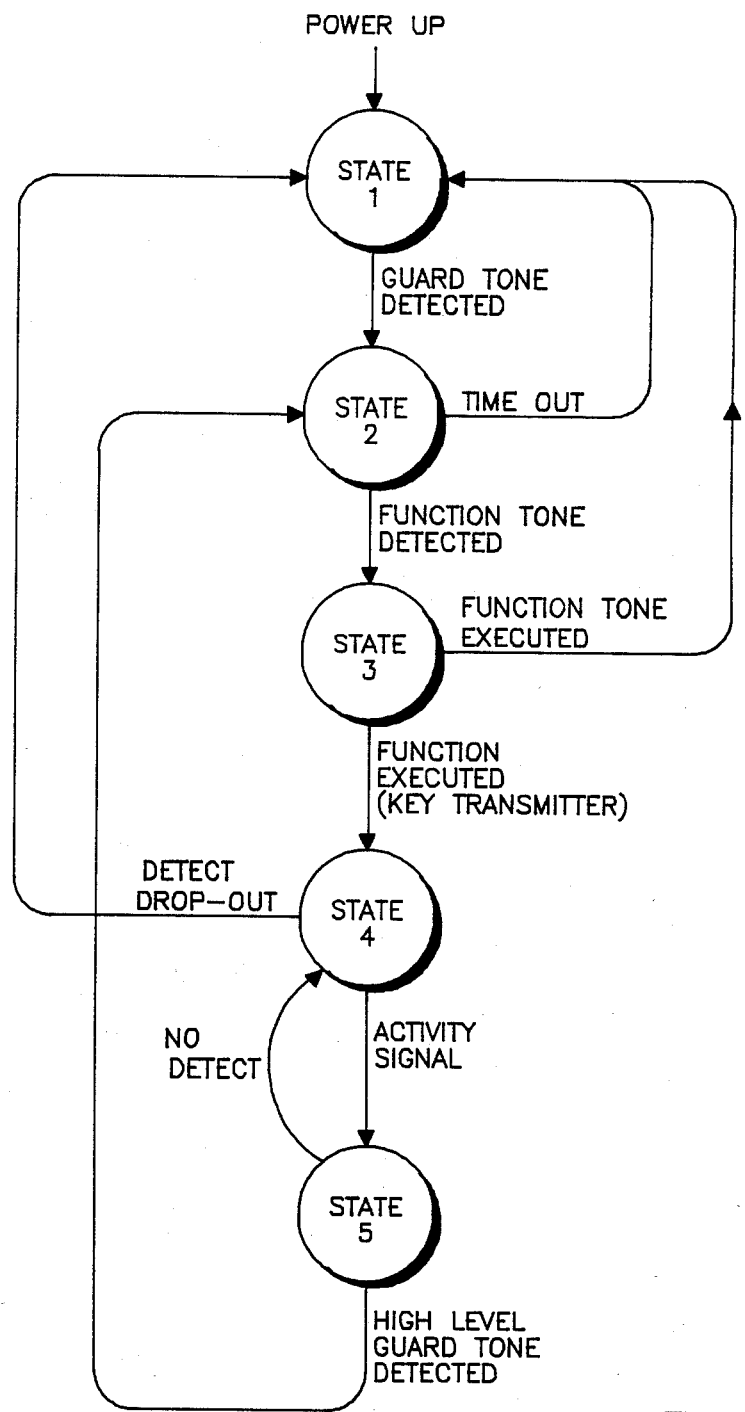
FIG. 4 is a state diagram of the decoder in FIG. 3.

FIG. 4 shows a state diagram of the decoder according to the invention. After power up the decoder shown in FIG. 3 is in a state 1 as defined by the control unit 10. The analog switch 5 is in contact with its #2 input and the tone detector 8 is in a guard tone detection condition. Also tone detector 8 is in low Q state. Upon entering state 1, either from power up or from state 4, the control unit 10 clears an internal counter in the tone detector 8 and clears the contents of latch 9. When the tone detector 8 receives sufficient energy at the guard tone frequency to cause an activation of its output the control unit 10 receives a detect signal. In response to this signal, the control unit 10 moves the decoder to state 2.

In the decoder's state 2 the control unit 10 activates its FT enable output which changes the tone detector 8 to detect one of the M function tones. The control unit 10 also causes the analog switch 5 to switch to its #1 thereby bypassing prefilter 4. In addition, the control unit 10 clears the contents of latch 9 in preparation for receiving fresh function commands. The control unit 10 remains in state 2 until it receives either a tone detect signal or a time out signal from the tone detector 8. If the control unit 10 receives a time out signal from the tone detector 8 it will return to a state 1 condition. If the control unit 10 receives a tone detect signal from the tone detector 8, the control unit 10 will move the decoder to a state 3 condition.

In the state 3 condition the control unit 10 causes the decoder to execute the function defined by the decoded tones. The control unit 10 does this by sending an enable function pulse to the clock input of latch 9 which stores and holds the M possible tones from the output of the tone detector 8. The latch 9 outputs the various tones to their appropriate control circuitry at the base station to implement the function command. If the function tone is a command to execute some function other than keying the transmitter the control unit 10 will return to state 1 after the latch 9 has stored the tone detected by the function tone decoder. If the detected function tone requires keying the transmitter the control unit 10 moves to a state 4 instead of state 1. The outputs for latch 9 which key the transmitter are fed back to the control unit 10. When the control unit 10 receives a signal from this feedback path indicating the transmitter is keyed, the control unit 10 will move from state 3 to state 4.

In state 4 the control unit 10 causes the decoder to look for LLGT. The control unit 10 activates the analog switch 5 to enable the prefilter 4. The tone detector 8 is in a mode to detect guard tone. It is also in a high Q state. From the signalling scheme as described in FIGS. 1a and 1b and FIGS. 2a through 2f, the LLGT indicates to the control unit 10 the presence of a audio voice signal which is being transmitted by the keyed transmitter. As long as the control unit 10 receives LLGT it will continue to hold the transmitter in a keyed condition. When the control unit 10 enters state 4, it initializes an internal counter in the tone detector 8. This will be explained in greater detail in connection with the preferred embodiment of the tone decoder 8 shown in FIGS. 7–12b. The internal counter of the tone detector 8 is initialized to a non-zero value in order to ensure the tone detector 8 reaches a threshold energy level before an internal clock in the tone detector 8 times out and indicates to the control unit 10 that LLGT has not been detected. In state 4 the control unit 10 is responsive to the detect output from the tone detector 8 and the level detect output from the level sensor 7. If the detect signal from the tone detector 8 discontinues the control unit 10 will drop out of state 4 after a predetermined time window has elapsed. The time window ensures that the lack of a detect signal from the tone detector 8 is not due to a transient condition but rather a genuine end of message. If the time window is exceeded an end of message is assumed and the control unit 10 returns the decoder to state 1 where the decoder looks for HLGT which marks the beginning of a new message. If HLGT is received by the decoder while the decoder is still in state 4, the level detect input of the control unit 10 will receive a signal from level sensor 7. In response the control unit 10 will move the decoder to state 5.

In state 5 the control unit 10 activates analog switch 5 to disable prefilter 4 so as to bypass it. In addition the control unit 10 lowers the Q of the tone detector 8 and clears the internal counter. Clearing the internal counter causes the tone detector 8 to dissipate the existing energy from detection of LLGT. If, after the control unit has moved the decoder into state 5, the output of the tone detector 8 still indicates a detection of a guard tone frequency, the control unit 10 will transfer the decoder from a state 5 to a state 2 since a high level guard tone detection indicates a new message is being transmitted. If while in state 5 the tone detector does not detect a guard tone frequency the tone detector 8 will time out causing the control unit 10 to return the decoder to state 4. All the while the decoder is in state 5 the key transmitter function continues to be activated at the output of latch 9 and therefore continues to transmit the incoming signal from the remote terminal.

The decoder as a whole occupies five possible states. The combination of prefilter 4, switch 5, limiter 6 and tone detector 8 provide the detection function in the system shown in FIG. 3 and can be collectively thought of as a "detector means" which is responsive to the control unit 10 to operate in four possible states. The four states correspond to four of the five decoder states. The first state is with the analog switch 5 connected to the output of prefilter 4, the tone detector 8 selected to detect guard tone frequency and the Q of the tone detector 8 selected to be low. The second state is the same as the first except the analog switch 5 chooses the input amplifier/AGC circuit 2 as the input to limiter 6 and the tone detector 8 is selected to detect function tone frequencies. In the third state the analog switch 5 selects the prefilter 4 as its input to the limiter 6. The tone detector 8 is selected to detect guard tone and the tone detector 8 is placed in a high Q condition. In the fourth state, the analog switch 5 selects the input amplifier-/AGC circuit 2 as the input to the limiter 6. The tone detector is selected to detect guard tone and it is in a low Q condition. The "detector means" has no fifth state since the third state of the decoder is the execution of the function tone which does not involve any of the circuit blocks which compose the "detector means".

Figure 5:
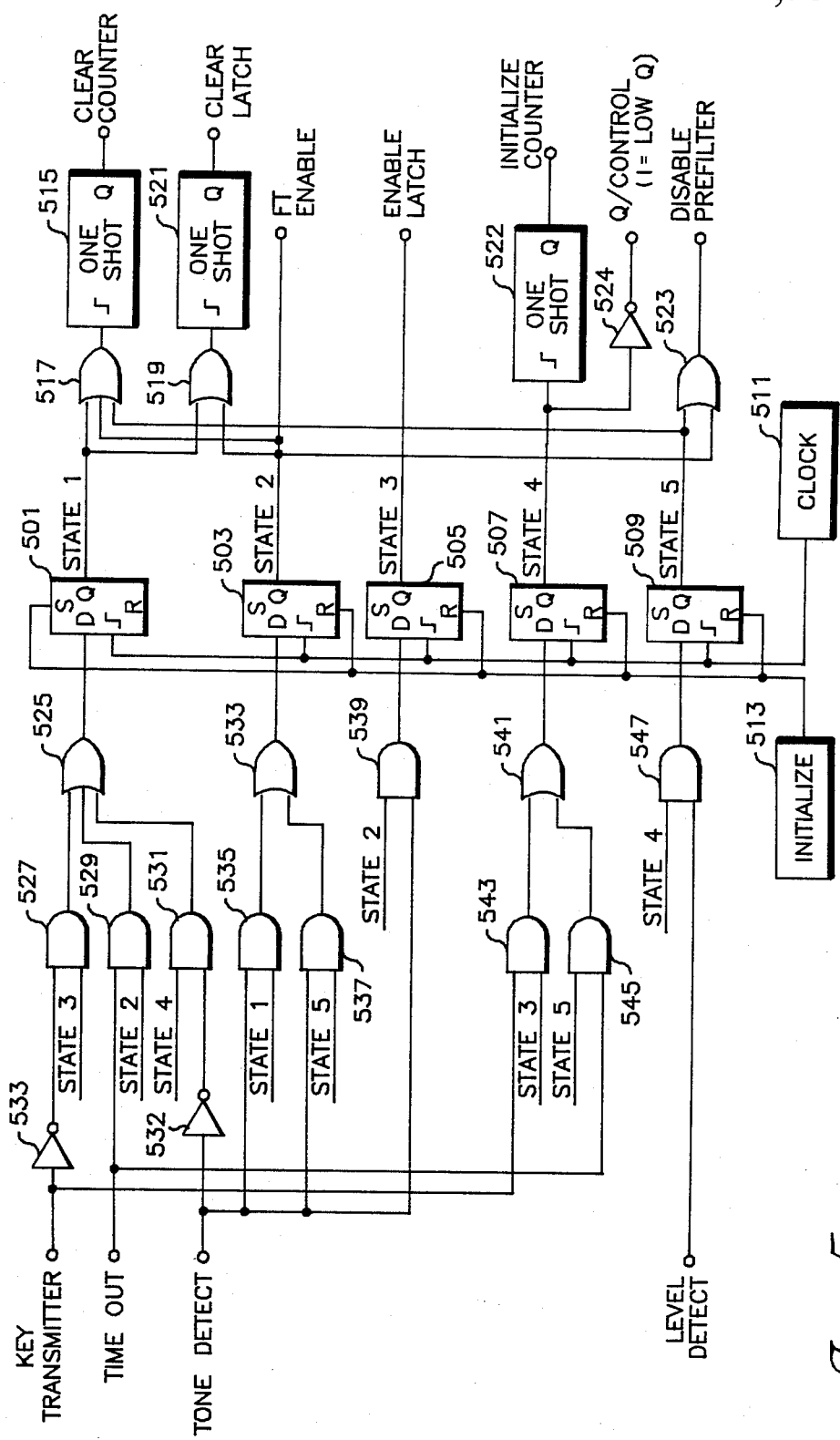
FIG. 5 is a circuit diagram of the control unit of FIG. 3.

FIG. 5 shows a circuit implementation of the control unit 10 in FIG. 3. Five D- type flip flops 501, 503, 505, 507, and 509 define a state machine for the five decoder states described in FIG. 4. Each flip flop is responsive to a clock input defined by internal free running clock 511 within the control unit 10. The set input to flip flop 501 and the reset inputs to flip flop 503, 505, 507, and 509 are linked to an initialize block 513 which initializes the circuit in state 1. The initialize block 513 can be implemented with a manual switch or key.

The Q output of flip flop 501 is connected to a one shot 515 by way of OR gate 517. The output of one shot 515 is the clear counter output of the control unit 10 in FIG. 3. The Q output of flip flops 503 and 509 also supply inputs to OR gate 517. Accordingly, flip flops 501, 503 and 509 each cause one shot 515 to produce a pulse output to clear the internal counter of the tone detector 8 in FIG. 3. Since flip flops 501, 507 and 509 are associated with state 1, state 2 and state 5 respectively, the control unit 10 clears the internal counter of the tone detector 8 as the decoder enters states 1, 2 and 5. Similarly, OR gate 519 has two inputs from flip flops 501 and 503 which correspond to states 1 and 2 respectively. A one shot 521 receives the output from OR gate 519. The pulse output of one shot 521 corresponds to the clear latch signal from the control unit 10 in FIG. 3. Therefore the control unit 10 clears latch 19 as it enters state 1 or 2. The disable prefilter output of control unit 10 is implemented by OR gate 523 which receives the Q outputs of flip flops 503 and 509, which correspond to states 2 and 5 respectively. As the decoder enters states 2 or 5 the control unit 10 disables the prefilter 4. One shot 522 is triggered by the output of flip flop 507. The one shot causes the internal counter of the tone decoder 8 to be initialized. Therefore the internal counter is initialized when the decoder enters state 4. The control unit 10 outputs of clear counter, clear latch and disable prefilter are all activated in a plurality of the states described in connection with FIG. 4. The FT enable, enable latch, initialize counter and Q control outputs of the control unit 10 are activated only in one of the states defined in FIG. 4.

Each of the flip flops 501 –509 are responsive to multiple gated inputs that are applied to the D inputs of the flip flops. The D input to flip flop 501 (which corresponds to state 1) is supplied by OR gate 525. The OR gate 525 receives its inputs from three two input AND gates 527, 529 and 531. The first input to AND gate 527 is the inverted signal from OR gate 20 in FIG. 3. The output of gate 20 indicates a keyed transmitter condition. The inverter gate 533 receives the key transmitter signal from gate 20. An active output of inverter gate 533 indicates a dekeyed transmitter condition. The second input to AND gate 527 is the Q output of flip flop 505 (state 3). If the function that is latched into latch 9 by the control unit 10 in state 3 does not key the transmitter, the control unit will return to a state one condition; i.e. the output of AND gate 527 and OR gate 525 will be high and will be clocked through to the Q output of flip flop 501.

The time out signal from the tone detector 8 in FIG. 3 and the Q output of flip flop 503 (state 2) are the two inputs to AND gate 529. The AND gate 529 will supply a signal to the D input of flip flop 501 by way of OR gate 525 when the tone detector 8 fails to receive a function tone within a predetermined time window. If this occurs, the control unit 10 will receive a time out signal from the tone detector 8 which the control unit is in state 2 which corresponds to an activated Q output of flip flop 503. AND gate 531 receives one input from the Q output of flip flop 507 (state 4) and its second input from the output of inverter 532. Inverter 532 receives the tone detect output from tone detector 8. Therefore if the control unit 10 receives a time out signal while in state 4, it will clock an active signal from the D input of flip flop 501 to the Q output of that flip flop. Thus the decoder will move from state 4 to state 1 when the LLGT drops out.

The D input to flip flop 503 comprises an OR gate 533 and two AND gates 535 and 537. The output of OR gate 533 provides the direct D input to flip flop 503. The outputs of AND gates 535 and 537 provide the two inputs to OR gate 533. AND gate 535 is a two input AND gate with its first input from flip flop 501 (state 1) and its second input from the detect output of the tone detector D AND gate 537 is a two input AND gate with its inputs from flip flop 509 (state 5) and the detect output of the tone detector 8. Therefore, the control unit 10 will enter state 2 (activated Q output of flip flop 503) when the control unit receives a detect signal from the tone detector 8 while the control unit is in either state 1 or state 5.

Since state 3 can only be entered from state 2, the D input to flip flop 505 is directly from the output of AND gate 539 rather than from an OR gate. The AND gate 539 has two inputs, one from flip flop 503 (state 2) and the other from the detect output of the tone detector 8. Since state 4 (flip flop 507) can be entered (activated) from state 3 or state 5 the D input to flip flop 507 consists of an OR gate 541 and AND gates 543 and 545. AND gate 543 receives its inputs from flip flop 505 (state 3) and the key transmitter output from OR gate 20 in FIG. 3. AND gate 545 receives its inputs from flip flop 509 (state 5) and the time out output from the tone detector 8. Therefore the control unit 10 will enter state 4 (an activated Q output of flip flop 507) from state 3 when the control unit 10 receives a key transmitter signal from OR gate 20. The control unit will enter state 4 from state 5 when the control unit 10 receives a time out signal from the tone detector 8. Finally, flip flop 509 which represents state 5 is activated at its D input by AND gate 547. AND gate 547 is a two input AND gate with its first input from flip flop 507 (state 4) and its second input from the level detect output of the level sensor 7 in FIG. 3. Therefore the control unit 10 will enter state 5 from state 4 when the control unit 10 receives a level detect signal from the level sensor 7. The control unit will return to state 4 if while in state 5 the control unit receives a time out signal from the tone detector 8. The control unit 10 will return to state 2 if while in state 5 it receives a detect signal from the tone detector 8.

PREFERRED EMBODIMENT OF THE INVENTION

FIGS. 6-13 are detailed circuit diagrams and flowcharts of the preferred embodiments for the control unit 10 (FIG. 6), the tone detector 8 (FIGS. 7-12b) and the limiter 6 (FIG. 13). The control unit 10 as shown in FIG. 5 is preferrably implemented in software. Implementation of the tone detector 8 is preferrably carried out by software as taught by the flowchart in FIGS. 11, 12a and 12b. Other tone detectors and limiters may be used in the decoder of FIG. 3 besides the ones shown in FIGS. 7-13. The component blocks of the decoder in FIG. 3 other than the tone detector 8, limiter 6 and control unit 10 are of conventional construction in the preferred embodiment.

A. The Control Unit

Figure 6:
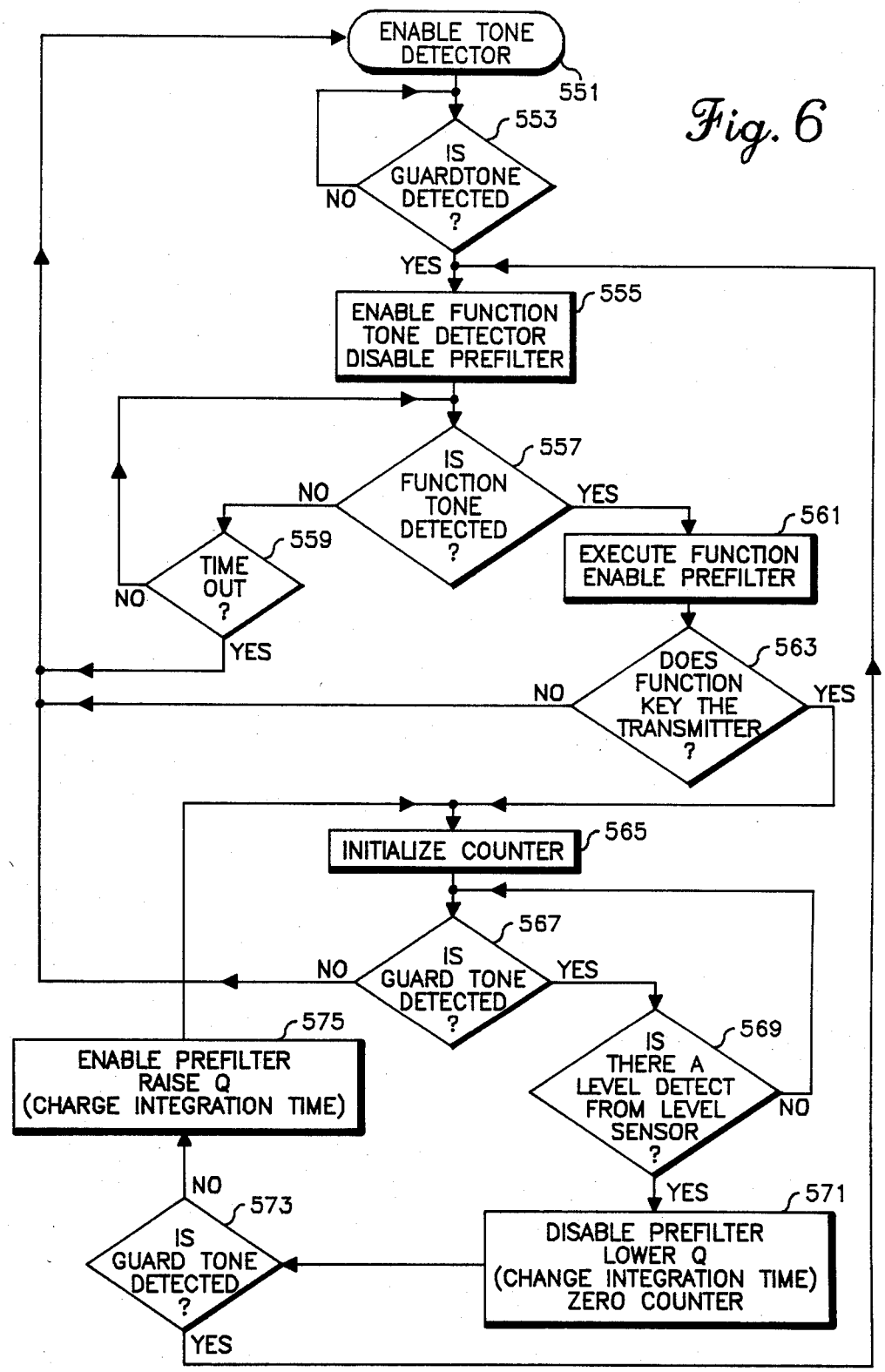
FIG. 6 is a flowchart for the software embodiment of the decoder in FIG. 3.
Figure 11:
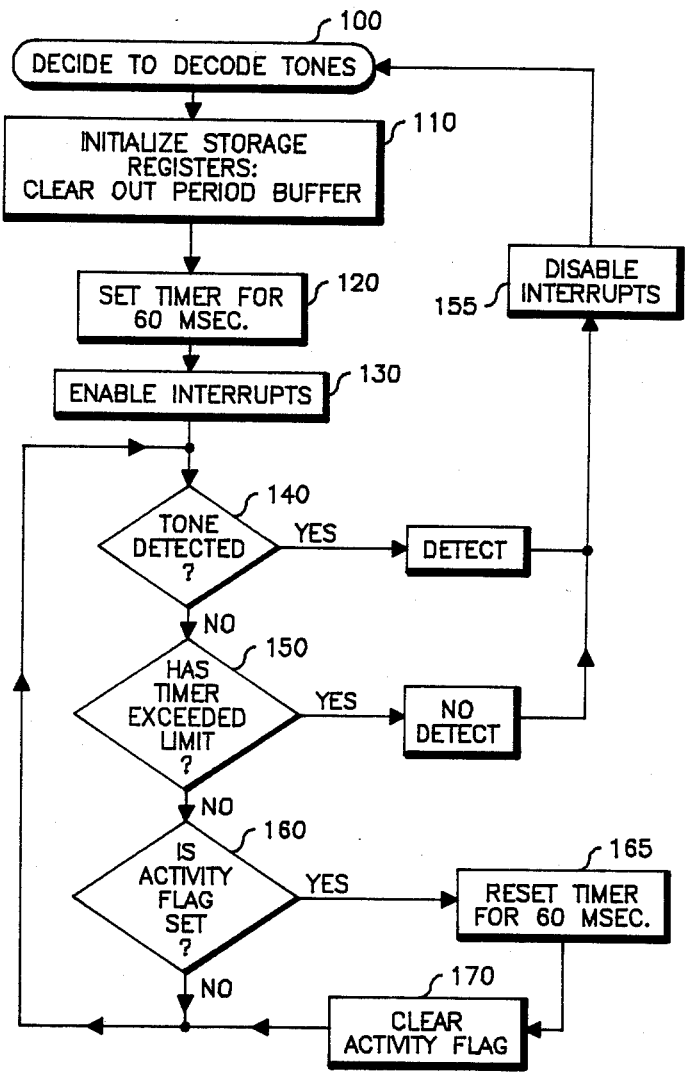
FIG. 11 is a flowchart of the background activity in a software embodiment of the tone detector in FIG. 7.

FIG. 6 is a flowchart for the software embodiment of the control unit 10 in FIGS. 3 and 5. The software embodiment for the control unit 10 is the preferred embodiment to implement the state diagram shown in FIG. 4. The central processor controlling this software will periodically enable the decoder in order to determine if a remote terminal is transmitting a message. The flowchart of FIG. 6 is the background software for the flowchart of FIG. 11, while the flowchart of FIG. 11 is the background software for the flowchart of FIGS. 12a and 12b.

In FIG. 6 the enable tone detector block 551 begins the software algorithm of the flowchart which implements the functions of the state diagram in FIG. 4. From the enable tone detector block 551 the flowchart enters decision block 553 which determines if guard tone is being received by the decoder. If guard tone is not being received the software simply loops back into the decision block 553 and continues to look for guard tone. This corresponds to state 1 in the state diagram of FIG. 4. If guard tone is detected, the flowchart moves to function block 555 which enables the function tone decoder and disables or bypasses the prefilter. The flowchart then enters decision block 557 where it determines if a function tone is detected. This corresponds to state 2 in the state diagram of FIG. 4. If a function tone is not detected, the flowchart moves decision block 559 where a decision is made whether the timer time limit has been exceeded. If it has not, the flowchart returns to decision block 557. If the timer has timed out without detecting function tone, the flowchart returns to enable tone detector block 551 (state 1). If a function tone is detected the flowchart moves from decision block 557 to function block 561. In function block 561 the software executes the function associated with the decoded function tone. This corresponds to state 3 in the state diagram of FIG. 4. In preparation for further processing the prefilter is enabled in function block 561. From function block 561 the flowchart moves to decision block 563 where the software determines if the executed function tone keyed the transmitter. If it did not, the flowchart returns to detection of guard tone in enable tone detector block 551 (state 1). If the transmitter is keyed the flowchart moves to function block 565 where the software initializes a counter (analoguous to internal counter mentioned in connection with FIG. 3). From function block 565, the flowchart moves to decision block 567 where the software determines if guard tone has been detected. This corresponds to state 4 in the state diagram of FIG. 4. If guard tone is not detected the flowchart returns to enable tone detector block 551. If guard tone is detected the flowchart moves to decision block 569 where the software determines if the level sensor has been activated. If it has not been activated, the flowchart returns to decision block 567. If the level sensor has been activated, the flowchart moves to function block 571. In this block the software disables the prefilter, lowers the Q (quality factor) of the detector by changing the integration time of the internal counter and zeros the internal counter. This acts to place the decoder into state 5 of FIG. 4. The internal counter is the same counter which was initialized in function block 565. From function block 571, the flowchart moves to decision block 573 where the software decides whether guard tone is detected. If it is not detected, the flowchart moves to function block 575 where the prefilter is enabled and the Q (quality factor) is raised by changing the integration time of the internal counter. This acts to place the decoder back into state 4 of FIG. 4. From function block 575 the flowchart moves back to the function block 565. If guard tone is detected in decision block 573 the flowchart moves back to function block 555 where the prefilter is disabled and the function tone detector is enabled. This corresponds to the movement in the state diagram of FIG. 4 from state 5 to state 2 in response to detection of HLGT.

B The Tone Detector

Figure 7:
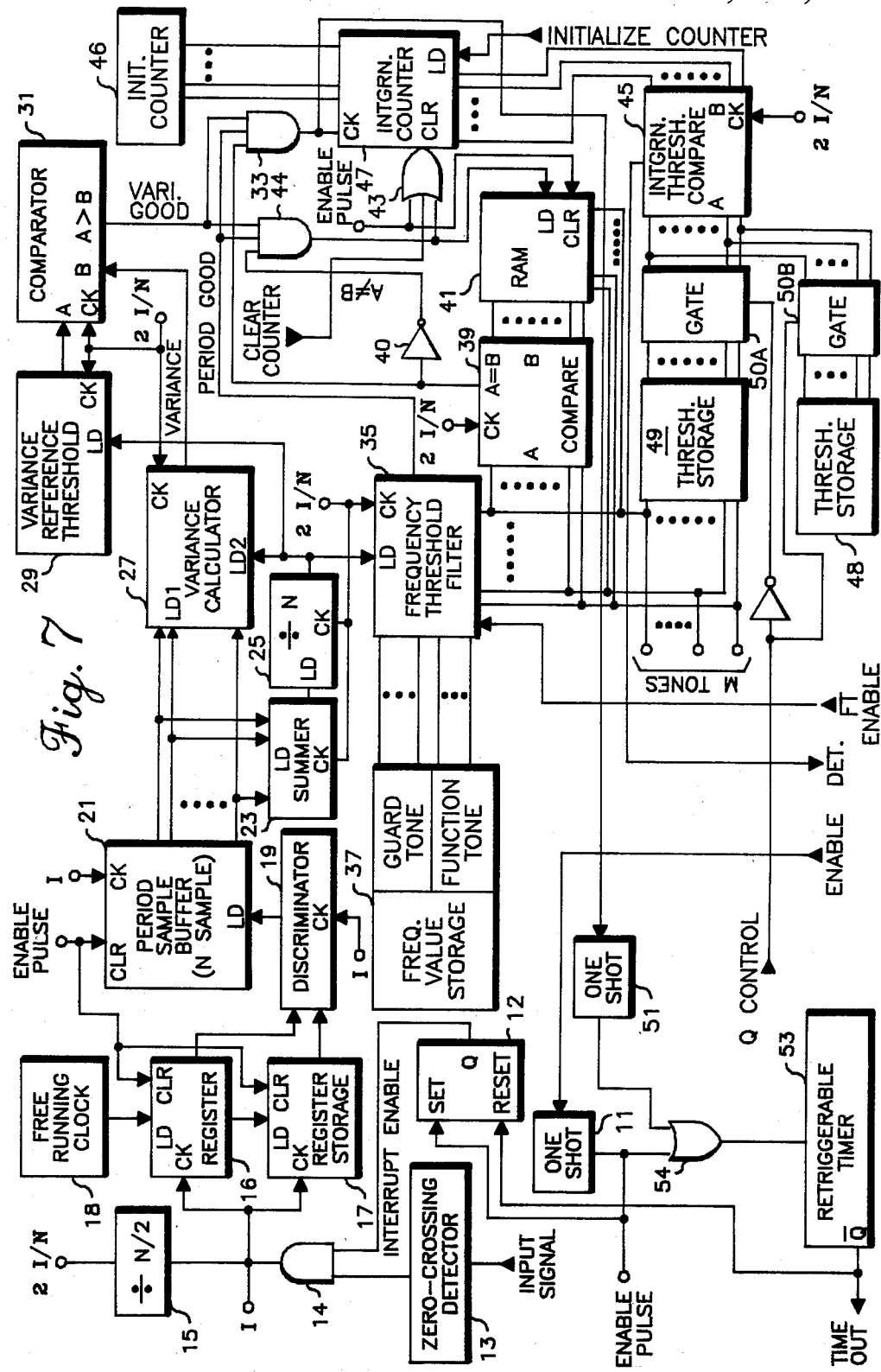
FIG. 7 is a block diagram of the tone detector and control unit of FIG. 3.

FIG. 7 shows a schematic block diagram of the preferred hardware embodiment for the tone detector 8 in FIG. 3. The detector determines if a valid tone has been received for a predetermined minimum amount of time. The detector circuit of FIG. 7 begins operation when an enable key is activated at the control unit 10. Operation of the enable key of control unit 10 triggers a one shot 11 which responds with an enable pulse at the one shot output. The enable pulse is an input to the set input of flip-flop 12. The Q output of flip-flop 12 is an interrupt enable signal which unblocks the output of a zero-crossing detector 13 by enabling AND gate 14. The Q output of flip-flop 12 and the output of zero-crossing detector 13 supply the two inputs to AND gate 14. Zero-crossing detector 13 is responsive to the limiter 6 in FIG. 3 to provide a squared-up output signal of the same frequency as the limiter output. On every negative-to-positive transition of the input signal to the zero-crossing detector 13, an interrupt signal is generated which serves as the time base for the detector 8. The output of AND gate 14 is an interrupt signal (I) which serves to directly clock a portion of the detector 8. A divide by N/2 circuit 15 divides the interrupt signal by a value N/2 where N is the number of sample registers in the decoder (to be discussed later). If N equals eight, then divide by N/2 circuit 15 serves to output a pulse every fourth time that the interrupt signal (I) occurs. The output of the divide by N/2 circuit 15 is a secondary interrupt signal labeled 2I/N in FIG. 7. The two signals I and 2I/N provide all the clock inputs to the various component parts of the decoder in FIG. 7. Each clock pulse allows the decoder to perform a new calculation.

A register 16, a storage register 17 and a free running clock 18 cooperate to store a analog value representative of the time of occurrence of two successive interrupt signals (I). Register 16 and storage register 17 receive the interrupt signal (I) at their clock inputs. When register 16 receives the interrupt signal (I) at its clock input its stores and holds the reading of the free running clock 18 present at its load input. Register storage 17, in response to receiving the interrupt signal (I) at its clock input, stores the information present at its load input. That information is the contents of register 16 which represents the analog value of the free running clock 18 at the previous interrupt signal (I) from the zero-crossing detector 13. The values stored in register 16 and register storage 17 are compared in a discriminator 19. The analog difference in value between register 16 and register storage 17 represents the time period between successive interrupt signals (I) which is the frequency period of the incoming tone.

The difference signal from discriminator 19 is the load input to a period sample buffer 21 which holds the N most recent outputs of discriminator 19. The period sample buffer 21, shifts its contents in response to the interrupt signal (I) received at its clock input. By shifting the contents of the period sample buffer 21 the difference signal from discriminator 19 is loaded into the first buffer location. The contents of the Nth buffer location is dropped and the Nth buffer location assumes the value that was previously in the N−1 buffer location. At every secondary interrupt (2I/N) the N outputs of the period sample buffer 21 are loaded into a summer circuit 23 which adds the N outputs and provides the results to a load input of a divide by N circuit 25. The divide by N circuit 25 is clocked by the secondary interrupt (2I/N) so that it performs a new calculation only when the summer 23 calculates a new sum from the N outputs of the period sample buffer. The output from the divide by N circuit 25 is a analog value representing the average period of the N periods stored in the period sample buffer 21. Since the summer 23 and divide by N circuit 25 are clocked by the secondary interrupt signal (2I/N), a new average period is calculated only twice in a full cycle of the period sample buffer 21. Therefore each sample is included twice in calculations of the average period. All the circuitry which follows the summer 23 and the divide by N circuit 25 in the decoder signal processing chain is clocked by the secondary interrupt signal (2I/N) since new values for the average period are calculated only at that time.

The N outputs of period sample buffer 21 are also loaded (at LD1) into a variance calculator 27. In addition the variance calculator 27 receives at a load input (LD2) the average period signal from divide by N circuit 25. The variance calculator 27 loads these signals present at its inputs every secondary interrupt (2I/N). The variance calculator 27 determines a average variance value for the N signals from period sample sample buffer 21. The average variance is calculated according to the equation below:

AVERAGE VARIANCE =

$$\frac{1}{N} \sum_{i=1}^{N} (\text{PERIOD SAMPLE } (i) - \text{PERIOD AVERAGE})^2$$

where N equals the number of locations in the period sample buffer 21. Each location in the period sample buffer 21 is identified as "PERIOD SAMPLE (i)" where i can be 1 to N. The variance for each PERIOD SAMPLE (i) is represented by the squared portion of the above equation, i.e. (PERIOD SAMPLE (i)−− PERIOD AVERAGE)$^2$, where "PERIOD AVERAGE" is the output of divide by N circuit 25. The variance calculator outputs an analog signal representative of the average variance. The circuit implementation of the variance calculator 27 is shown in FIG. 8.

A variance reference threshold 29 receives the average period value from the divide by N circuit 25 at its load input. The variance reference threshold is $$\text{VARIANCE THRESHOLD} = \frac{(\text{PERIOD AVERAGE})^2}{K}$$

where K is a constant (used to adjust the threshold value) and "PERIOD AVERAGE" is the average period calculated by summer circuit 23 and divide by N circuit 25. The analog output of the variance reference threshold 29 represents the maximum permissible average variance for a valid tone. If each sample period is significantly different but averages to a valid tone, the average variance will be above the threshold value. Therefore the tone detector 8 will not enable its detect output. The circuit implementation of the variance reference threshold 29 is shown in FIG. 9.

The results of the calculations by the variance calculator 27 and the variance reference threshold 29 are output to the A and B inputs of a comparator 31 which compares the two analog values and determines if the average variance from the variance calculator 29 is greater than the threshold value from the variance reference threshold 29. Comparator 31 is clocked by the secondary interrupt signal (2I/N). If the average variance from the period samples in the N period sample buffer 21 is less than or equal to the threshold value from the variance reference threshold 29 then the comparator 31 will output a binary signal (VARIANCE GOOD) to AND gates 33 and 44. AND gate 33 requires all three of its inputs to be activated before a signal will appear at its output. The second and third inputs to AND gate 33 are derived from determinations made in connection with frequency threshold filter 35.

When frequency threshold filter 35 receives the secondary interrupt signal (2I/N) at its clock input it compares the output from the divide by N circuit 25 with a series of analog values stored in the frequency value storage circuit 37. If the average period output by the divide by N circuit 25 is within the range of any of the stored tone values in the frequency value storage circuit 37 the frequency threshold filter 35 will output a binary signal (PERIOD GOOD) to the second input of AND gates 33 and 44. The frequency value storage circuit 37 is divided into a guard tone portion and a function tone portion. The control circuit 10 controls the frequency value storage circuit 37 to switch the tone decoder from a function tone decoder to a guard tone decoder and vice versa.

A second output of the frequency threshold filter 35 is a plurality of parallel outputs which are binary coded signals and represent the particular tone value detected by the frequency threshold filters 35. With every secondary interrupt signal (2I/N) a compare circuit 39 compares the parallel binary outputs from frequency threshold filter 35 with a binary value stored in RAM 41. If the binary value stored in RAM 41 equals the value of the parallel binary outputs of frequency threshold filter 35, a signal (A=B) is delivered to AND gate 33. Gate 40 inverts signal A=B to generate the signal A≠B.

Gate 44 is a 3 input AND gate whose output is connected to the load input of RAM 41 and the clear input of an integration counter 47 by way of OR gate 43. The A≠B signal from inverter gate 40 is a first input to AND gate 44. The second input to AND gate 44 is the PERIOD GOOD binary signal from the frequency threshold filters 35. The third input is the VARIANCE GOOD binary signal from comparator 31. When all three inputs to the AND gate 44 are activated the AND gate output will be activated and cause RAM 41 to load into storage the current binary coded tone signal present at the output of frequency threshold filter 35. The output of AND gate 44 will also clear the count in integration counter 47. The function of AND gate 44 will be explained more fully in connection with integration counter 47.

At the next secondary interrupt (2I/N) the compare circuit 39 will compare an updated output of frequency threshold filter 35 with the value in RAM 41. The value in RAM 41 always represents binary coded tone output from the frequency threshold filter 35 at the last secondary interrupt (2I/N) when the period good signal and variance good signal were activated. This is true since the AND gate 44 loads a new value into RAM 41 from the frequency threshold filters only when the new value is different than the present value and both the variance and period are good as indicated by the outputs from the frequency threshold filters 35 and comparator 31. If a noise disrupts the valid tone temporarily the RAM will hold its value since the noise, although it will most likely cause a new binary output at frequency threshold filters 35, will not cause a variance good signal. All three conditions, i.e. period good, variance good and a new binary tone value, are required before the RAM 41 will be loaded with the new value.

Integration counter 47 has a clock input which receives the output pulses from AND gate 33. Activation of the output of AND gate 33 will occur at each secondary interrupt (2I/N) when there is a PERIOD GOOD signal from output of frequency threshold filter 35, a VARIANCE GOOD signal from comparator 31 and a A=B signal from compare circuit 39. Activation of all of these outputs means that a recognizable tone has been sensed (a valid tone period whose variance is less than a predetermined value) and the valid tone is the same frequency as the last valid tone sensed. With these conditions met the output of AND gate 33 will clock the integration counter 47 causing its stored count to increment by one. A clear counter input to gate 43 from the control unit 10 allows the control unit 10 to de-energize the tone detector as it switches the detector from one state to another. This ensures that no energy stored from a previous detector state influences the detector function in its present state. Initialization counter 46 is coded with a count which places the integration counter 47 in a pre-energized state. The contents of the initialization counter 46 is loaded into the integration counter 47 in response to the initialize counter output from control unit 10.

If the frequency detected at the frequency threshold filter 35 changes value the comparison at compare circuit 39 will cause a signal (A≠B) at the output of inverter gate 40 indicating that the period of the tone is not the same as the period of the tone previously received (the previous period is stored in RAM 41). In such a case the output of AND gate 44 will be activated to cause integration counter 47 to clear its count. Compare circuit 39 performs a comparison at each secondary interrupt (2I/N). Similarly integration threshold compare circut 45 compares the binary output of a integration counter 47 with the binary output of either threshold storage circuit 48 or threshold storage circuit 49 at each secondary interrupt (2I/N).

If counter 47 reaches a count high enough that it becomes equal to or greater than the binary values stored in threshold storage 48 or 49 then a valid tone has been present for a sufficient period of time to merit a positive detection signal from integration threshold circuit 45 to the control unit 10. To implement this, integration threshold compare circuit 45 compares the output of integration counter 47 with the contents of threshold storage 48 or 49 and outputs a detect signal when the count in integration counter 47 is equal to or greater than the binary number stored in threshold storage 48 or 49. Threshold storage 49 is responsive to inputs from the frequency threshold filter 35. Each frequency, as represented by the binary states of the parallel outputs of the frequency threshold filter 35, has a time interval associated with it that is binary coded and stored in threshold storage 49. Threshold storage 49 acts as a look-up table for each tone frequency to determine what binary time value to compare in integration threshold compare circuit 45 with the binary time count in integration counter 47. The activated output of threshold compare circuit 45 indicates a detection of a valid tone for a minimum time necessary to insure a reliable tone detection. Threshold storage circuit 48 implements the change in quality factor during guard tone decoding as explained in connection with FIG. 3. Gate 50 controls which threshold storage circuit 48 or 49 is received at the A inputs to the integration threshold compare circuit 45.

In addition to serving as a clock for integration counter 47 the output of AND gate 33 also serves as the trigger input to one shot circuit 51 (activity flag). One shot 51 provides a pulse output in response to AND gate 33 to a first input of two input OR gate 54. The output of OR gate 54 provides the retrigger input to retriggerable timer 53. The second input to OR gate 54 is the enable pulse from the one shot 11. As explained earlier the enable pulse also sets the flip-flop 12. When the retriggerable timer 53 times out it outputs a pulse from its Q output to the reset input of flip-flop 12. It also delivers a pulse to the control unit 10 that no valid tone has been sensed in response to the operator's activation of the enable key. Preferably the period of retriggerable timer 53 is a 60 millisecond period. Therefore if the activity flag signal by way of one shot 51 does not reset the retriggerable timer 53 more often than once every 60 milliseconds the retriggerable timer 53 will time out and will reset the flip-flop 12 which disables the interrupt signal (I). It should be noted that the time window for a valid tone detection as represented by retriggerable timer 53 can be changed to any desired time interval. A 60 millisecond time window is used in conjuction with the software implementation of the decoder according to the invention.

In operation, the operator at the control unit 10 activates the enable key which introduces an enable pulse to the tone detector 8 by way of one shot 11. The enable pulse initializes the decoder by clearing register 16, register storage 17, period sample buffer 21, RAM 41, integration counter 47 and triggering retriggerable timer 53. The enable pulse also activates flip-flop 12 so that the interrupt signals (I and 2I/N) sourcing from zero-crossing detector 13 are delivered to the decoder circuitry for processing. The tone detector 8 processes the interrupt signals from the zero-crossing detector 13 in the manner previously described. The control unit 10 will receive either a valid tone detect a no detect indication. If a valid tone is detected, the tone value is determined from the output of the frequency threshold filter 35. It should be noted that all circuits in the signal processing chain up to and including the variance reference threshold 29, the variance calculator 27 and the frequency threshold filter 35 of the tone detector 8 in FIG. 3, are analog devices. The outputs of the variance reference threshold 29, the variance calculator 27 and the frequency threshold filter 35 are binary signals. The remainder of the circuitry in the processing chain of the tone detector are digital circuits.

FIG. 8 shows a circuit diagram for the variance calculator 27 shown in FIG. 7. The variance calculator 27 receives inputs from the period sample buffer 21 in FIG. 7 and the divide by N circuit 25 in FIG. 7. The N outputs from the period sample buffer 21 are each applied to a positive input of subtractor circuits 61(1)-61(N). Each subtractor circuit receives at its negative input the period average signal from divide by N circuit 25. Each output of the subtractor circuits 61(1)-61(N) is squared by multiplication circuits 63(1)-63(N). The resulting squared values from each of the multiplier circuits 63(1)-63(N) are added together in a summer circuit 65. The output of summer circuit 65, representing the sum of the outputs from multiplier circuits 63(1)-63(N), is applied to a divide by N circuit 67 which provides a analog output value representative of the average analog signal from multiplier circuits 63(1)-63(N).

The output from divide by N circuit 67 is applied to a transmission gate 69 whose gate input is responsive to the secondary interrupt signal (2I/N). Therefore, the output of the transmission gate 69 presents to a storage capacitor 71 the average value of the multiplier circuits 63(1)-63(N) only at every secondary interrupt (2I/N). The subtractor circuit 61(1)-61(N) calculate the difference between the average value of the N samples in the period sample buffer 21 and each individual period value. The difference can be positive or negative, therefore, the output is squared by multiplier circuits 63(1)-63(N) in order to remove any negative values that might be output from the subtractor circuits. The resulting analog output of the multiplier circuits 63(1)-63(N) represent the variance of each sample in the period sample buffer 21. The transmission gate 69 and capacitor 71 can be thought of as a sample and hold circuit which samples the output of the divide by N circuit 67 at every secondary interrupt (2I/N) and holds the output value until the next secondary interrupt (2I/N).

FIG. 9 shows a circuit diagram for the variance reference threshold 29 shown in FIG. 7. The average period from the divide by N circuit 25 is squared at multiplier 73 and then divided by a constant K at divider circuit 75. The analog value of the constant K is predetermined by the variance threshold level desired. The variance threshold level provides the major control over false detection of tones under noisy input signal conditions. The magnitude of constant K is inversely proportional to the detection sensitivity and falsing characteristics of the tone detector. Generally, doubling the magnitude of the constant K causes system sensitivity to decrease by 3 db and exponentially increases the likelihood of a false detection (thus the signal-to-noise ratio would need to be 3 db higher for detection probability to stay the same). The value of the constant K can be adjusted empirically to the desired tradeoff between sensitivity and falsing. Unlike conventional tone detectors, the use of a constant K to set the detect threshold has the added benefit that it has no effect on the frequency detection bandwidth.

The output of the divider circuit 75 is applied to a transmission gate 77 which is gated by the secondary interrupt signal (2I/N). The output of the transmission gate 77 is applied to the comparator 31 in FIG. 7. The output of the transmission gate 77 is joined to a storage capacitor 79 which holds the analog value at the transmission gate output after the secondary interrupt (2I/N) has been removed. The multiplier circuit 73 squares the average period value in order for the output of the variance threshold calculator 29 to be compatible with the output of the variance calculator 27. The constant equals K block 76 is used to adjust the value of the analog output of the threshold variance calculator 29 to a level that insures sufficient accuracy in determining a valid tone. The transmission gate 77 and storage capacitor 79 act as a sample and hold circuit in a manner similar to the transmission gate 69 and capacitor 71 in FIG. 5.

Figure 10:
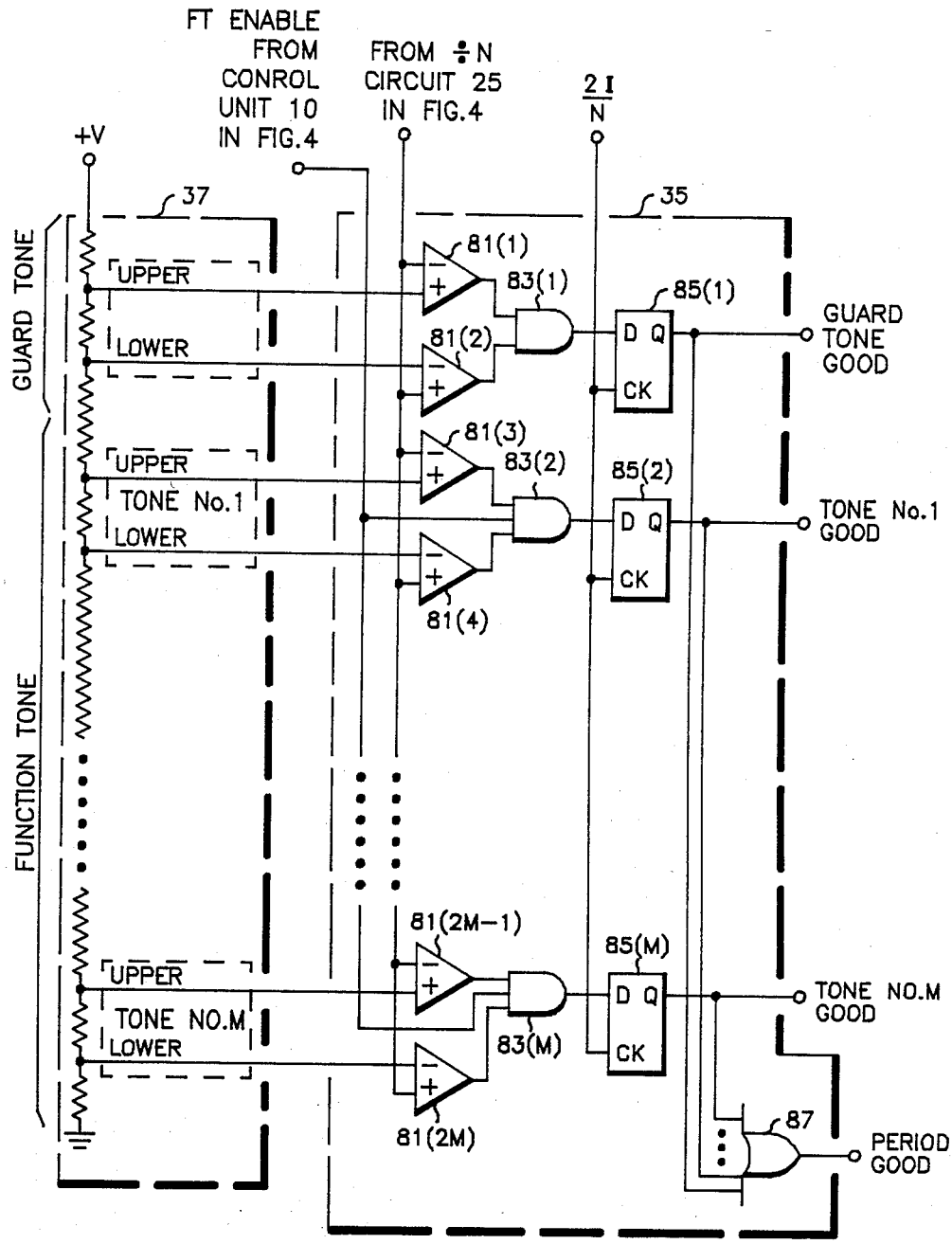
FIG. 10 is a circuit diagram of the frequency value storage block and the frequency threshold filter of FIG. 7.

FIG. 10 shows a circuit diagram for the frequency value storage 37 and the frequency threshold filter 35 in FIG. 7. The frequency value storage 37 is a resistive ladder with reference points chosen at appropriate locations in order to define analog levels which by system design are upper and lower limits of valid average periods from divide by N circuit 25 in FIG. 7. Each of these upper and lower reference values are input to the frequency threshold filter 35. In frequency threshold filter 35, each upper and lower analog reference voltage from the frequency value storage 37 is input to a operational amplifier 81(1)-81(M). There can be any number of identifiable tones stored in the frequency value storage 37. In FIG. 7 the tones are identified 1 through M. The first tone is shown in FIG. 10 as guard tone. The remaining M-1 voltage levels represent possible function tones.

In the frequency threshold filter 35, two of the operational amplifiers 81(1)-81(2M) are required for detection of each tone. Therefore, the number of operational amplifiers is 2M. The operational amplifiers 81(1)-81(2M) are associated in pairs. The first operational amplifier of the pair receives the upper analog reference value for a given tone at its positive input. The lower analog reference voltage for the selected tone is input to the negative input of the second operational amplifier of the pair. The operational amplifiers 81(1)-81(2M) act as comparator circuits which have binary compatible outputs. Therefore, if the period average analog signal from the divide by N circuit 25 is between the upper and lower analog reference values for a given tone, the outputs of the associated operational amplifiers will both be logical highs. Three input AND gates 83(1)-83(M) receive the two outputs of the operational amplifiers that are paired together for the upper and lower limits of a given tone. The third input to AND gates 83(2)-83(M) is the FT enable signal from the control unit 10. The FT enable input to the AND gates 83(2)-83(M) affectively disables/enables those operational amplifiers associated with detection of function tones. Each output of the AND gates 83(1)-83(M) serves as the D input to D type flip-flops 85(1)-85(M). The clock input to each of the D type flip-flops 85(1)-85(M) is connected to the secondary interrupt signal (2I/N). Therefore, the D type flip-flops 85(1)-85(M) clock the outputs of AND gates 83(1)-83(M) to the Q output of the D type flip-flops upon reception of every secondary interrupt signal (2I/N). The outputs of the D type flip-flops 85(1)–85(M) are the parallel binary coded outputs of the frequency threshold filter 35 in FIG. 4. Each of the Q outputs of the D type flip-flops 85(1)–85(M) are input to a OR gate 87. The output of OR gate 87 is activated when any one of the Q outputs of the D type flip-flops 85(1)–85(M) are activated. Therefore, when the frequency threshold filter circuitry indicates that one of the M tones is present the output of OR gate 87 will indicate a PERIOD GOOD signal to AND gates 33 and 44 in FIG. 7.

FIG. 11 shows the background software flowchart for the preferred embodiment of a software implementation of the tone detector 8 shown in FIG. 7. By analogy, the activity in the background software would be carried out by the control unit 10 and blocks 11, 12, 51, 53 and 54 in FIG. 7. The control unit 10 for purposes of the preferred embodiment could be a microprocessor based circuit with software shown by the flowchart of FIG. 6. In the first block 100 the transmitter must decide to decode incoming tones from a remote dispatch point. This event may occur when the equipment operator pushes the enable key on the control unit 10 in FIG. 3. In the preferred embodiment, the microprocessor periodically and continually enables the tone detector 8 to check for guard tone. After enablement the flowchart moves to an initialization block 110 which initializes all the storage registers (such as register 16, register storage 17 and RAM 41 in FIG. 7) an integration counter (corresponding to integration counter 47 in FIG. 7) and the period buffer (corresponding to the period sample buffer 21 in FIG. 7). As part of the process of initialization the next block 120 retriggers the retriggerable timer for its 60 millisecond time-out period. The timer in block 120 corresponds by analogy to the retriggerable timer 53 in FIG. 7. As the last step before beginning decoding, block 130 enables the interrupt signal to the tone detector circuitry. The interrupt signal corresponds to the signal I in FIG. 7 and is enabled by flip-flop 12 and AND gate 14. In FIG. 7 the transmitter site operator's decision to send an enable signal out to the tone detector circuitry from control unit 10 operates to perform all the steps in blocks 100–130.

The decoder will receive from the tone detector 8 one of three conditions after it has enabled the interrupt to the tone detector circuitry. The first is a tone detect shown by decision block 140 in FIG. 11. By analogy if a tone is detected in the tone detector 8 of FIG. 3, a signal will appear at the detect input of the control unit 10. If no detection occurs then the transmitter may sense the time-out of the 60 millisecond timer. This is shown symbolically at decision block 150 in FIG. 11. If either a tone detect or a timer time-out has occurred, the interrupt is disabled in block 155, thereby holding the current values in the tone detector 8 and the software returns to block 100 to wait for the next decision to decode. If neither a tone detect nor a timer time-out has occurred then a signal at an activity flag output from the tone detector 8 will indicate to the transmitter whether the tone detector 8 is continuing to decode a valid signal or if there is no valid signal present in the tone detector 8. This is represented by decision block 160 where a sensing of a signal by the activity flag will retrigger the 60 millisecond timer in block 165. The flowchart then moves to block 170 where the activity flag is cleared. From block 170 the software returns to block 140 for 60 milliseconds more of decoding time or if no activity flag is sensed the software returns to block 140 without renewing the timer time limit and clearing the activity flag.

Figure 12A:
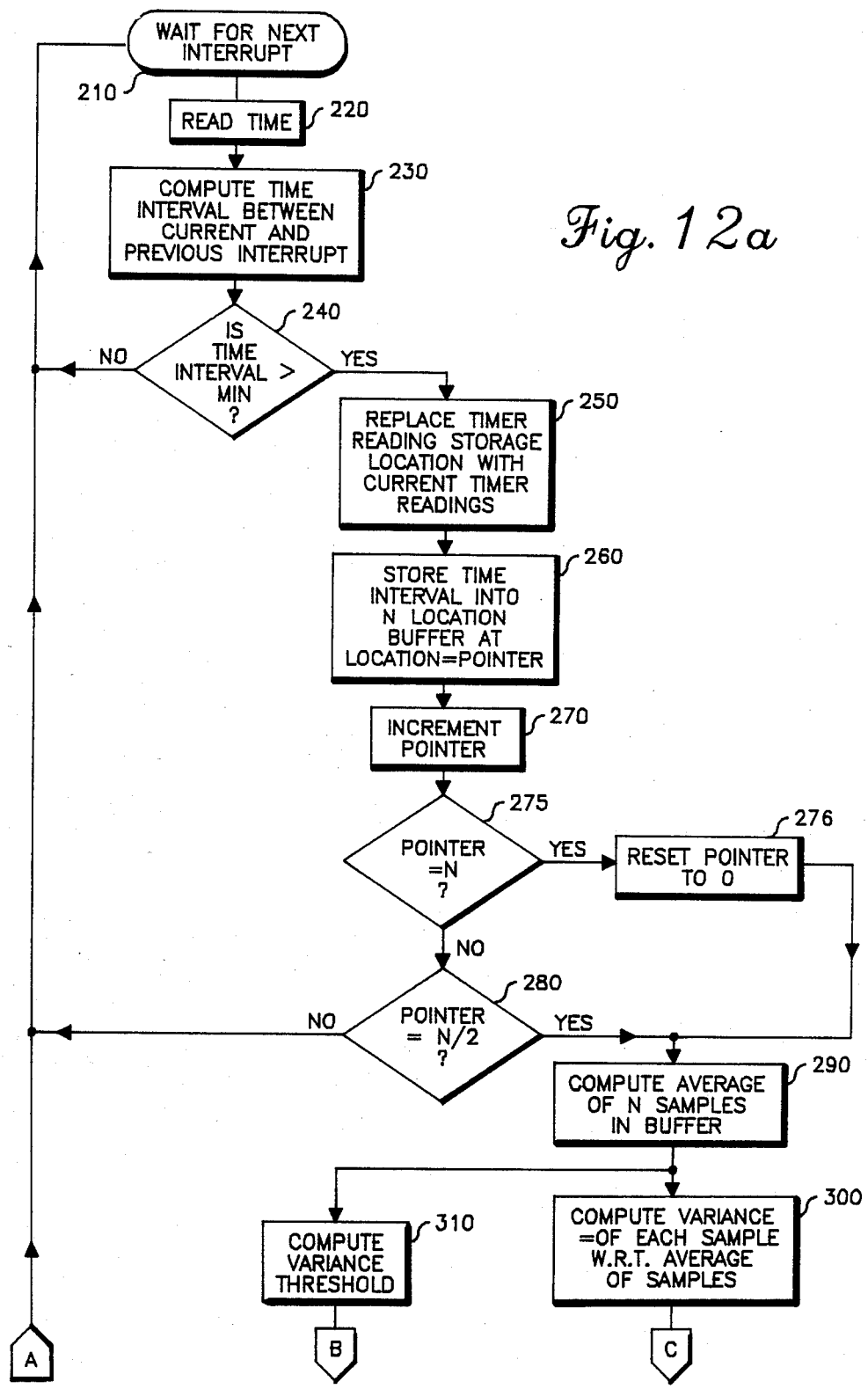
FIGS. 12a and 12b are flowcharts of the foreground activity in a software embodiment of the tone detector in FIG. 7.
Figure 12B:
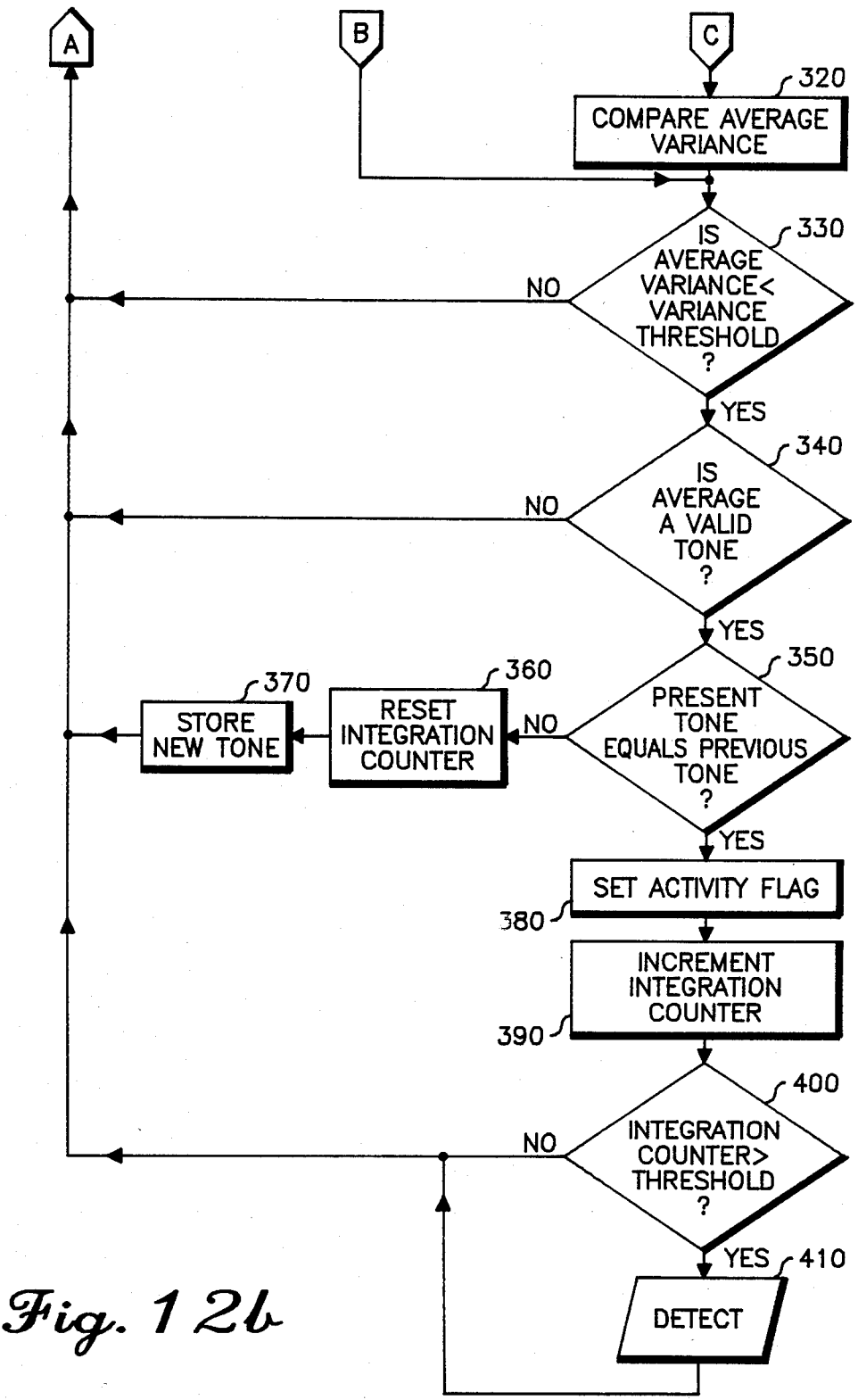
Figure 13:
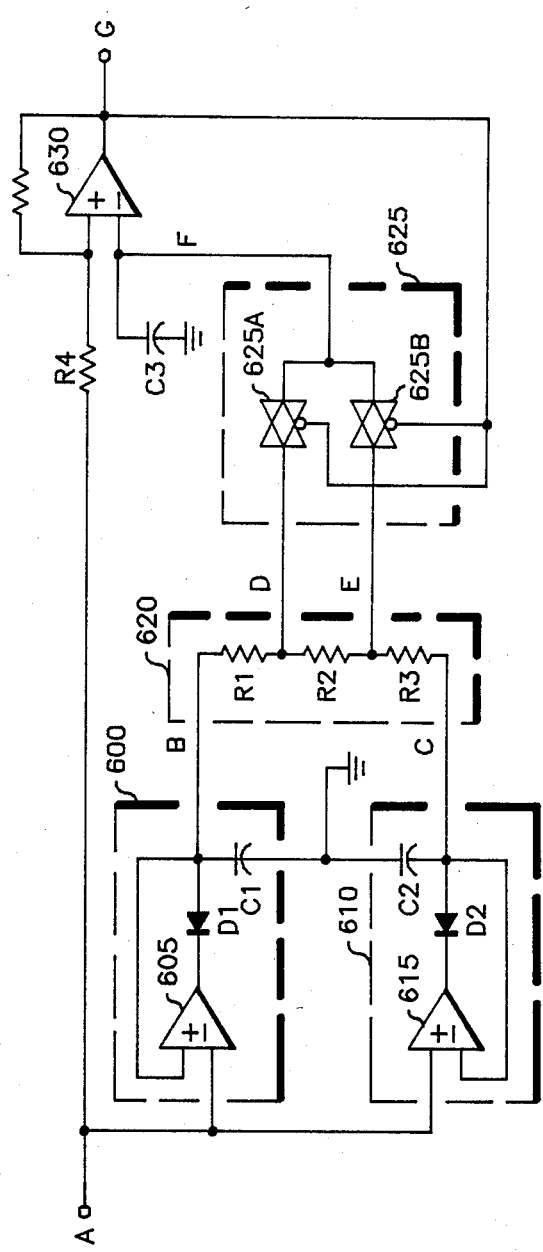
FIG. 13 is a circuit diagram of the limiter in FIG. 3.

FIGS. 12a and 12b show the foreground software flowchart for the decoding operation shown by the circuit in FIG. 7. The first block 210 is a wait for next interrupt precondition. When the decoder receives an interrupt it moves to block 220 where it reads the time of the free running clock (corresponding to clock 18 in FIG. 7) by storing the value of the free running clock into a memory location (register 16 in FIG. 7). In computation block 230 the time interval between the current time reading and the time reading from the previous interrupt is calculated. This corresponds to the function of discriminator 19 in FIG. 7. Decision block 240 is designed to catch glitches or other obviously invalid time intervals before the software acts on such a time interval. If the time interval is less than some predetermined minimum value the flowchart will return for a wait for next interrupt precondition in block 210. If the time interval is greater than the minimum then the flowchart will move on to the next steps in decoding the received tone. There is no circuit block in FIG. 7 which corresponds to decision block 240 is FIG. 12a. Decision block 240 is not necessary for proper operation of either a hardware or software decoder according to the invention. Decision block 240 is included though in the preferred embodiment of the invention to protect the tone detector 8 from abnormally high input frequencies. If the time interval is greater than the minimum decision block 240 will lead to calculation block 250. Here the flowchart replaces the timer reading storage location with the current timer reading. This corresponds to the current reading in register 16 of FIG. 7 being stored into the register storage 17.

Activity block 260 stores the time interval computed in computation block 230 into a N location buffer at a location point determined by the value of a pointer flag. The pointer is analogous to the intermediate outputs from the divide by N/2 circuit 15 in FIG. 7. The pointer flag is a software device to keep track of the current location in memory. Activity block 260 corresponds to the function of the period sample buffer 21 in FIG. 7. In block 270 the value of the pointer flag is incremented by one to indicate the next location in the N location buffer. Decision block 275 asks if the pointer value is equal to N. This step is necessary since the N locations of the buffer are identified by 0 through N−1. If the answer is yes in decision block 275, the software moves to decision block 276 which resets the pointer to zero. The software then moves forward to computation block 290. If the answer is no in decision block 275 the software moves to decision block 280 which determines if the value of the pointer is N/2. If the pointer value is not equal to N/2 (and also necessarily not equal to 0 either) the flowchart returns to a wait for next interrupt precondition in block 210. If the pointer value is N/2 the flowchart moves on to further processing of the input signal at block 290. In the hardware embodiment of the invention in FIG. 7, this step is represented by divide by N/2 circuit 15 which generates the secondary interrupt signal (2I/N) to clock portion of the decoder circuitry. Decision block 280 is included in the software embodiment since calculating the average variance and average period each time an interrupt is received is very time consuming. From this fact it was determined that sufficient accuracy can be maintained with only two calculations of the average variance during a full cycle of a N location storage register where N equals 8 (the software storage locations are identified 0 through 7). With N equal to eight in decision block 280, if the pointer equals 4 the flowchart continues on to computation block 290 which computes the average time period for the N time periods stored in the N location buffer of block 260. This calculation corresponds to the function of summer 23 and divide by N circuit 25 in FIG. 7.

From computation block 290 the software flowchart branches off into two parts. In the first branch calculation block 300 computes the variance of each of the N periods with respect to the average period of the samples as determined by calculation block 290. In the second branch of the flowchart computation block 310 calculates the variance threshold as determined by the average period of the N samples calculated in calculation block 290. The calculation in computation block 300 corresponds to part of the function of the variance calculator 27 in FIG. 7. The calculations in computation block 310 corresponds to the function of the variance reference threshold circuit 29 in FIG. 7. After a variance has been computed for each sample in computation block 300 the software moves down to computation block 320 where a average variance is calculated. The activity in computation 320 corresponds to the remainder of the function of the variance calculator 27 in FIG. 7.

At this point in the flowchart the two parallel branches of the program join at decision block 330 to determine if the average variance is less than the variance threshold. If the average variance is greater than the variance threshold the flowchart returns to block 210 and waits for the next interrupt. If the average variance is less than the variance threshold then the flowchart continues to decode. Decision block 330 corresponds to the function of comparator 31 in FIG. 7. With the decision made in block 330 to continue decoding the flowchart moves on to decision block 340 to determine if the average time interval calculated in computation block 290 is one of the tones intended to be sensed by the tone detector. Block 340 looks to see if the average time interval is a valid period. If the decision is no, the flowchart returns to the wait for the next interrupt block 210. If the decision is yes, the flowchart continues to decode the signal. Determining if the average is a valid period corresponds to the function of the frequency threshold filter 35 in FIG. 7.

From a yes decision in decision block 340 the flowchart moves on to decision block 350 where the software determines if the previous tone calculated is equal to the present tone. If the tones are not equal the integration counter (corresponding to integration counter 47 in FIG. 7) is reset in block 360 and the new tone is stored in memory in place of the previous tone in block 370. The flowchart then returns to the wait for next interrupt block 210. This decision path determines that the present tone is not the same frequency as that of the last calculated tone. Therefore neither the present or former calculated tone have not been present at the input of the tone detector 8 for a time period sufficient to indicate that either are valid tones. As such the old tone is forgotten and the new tone is stored into memory and referred to when the next calculation is done.

Decision block 350 and computation blocks 360, 370 correspond to compare circuit 39, RAM 41 and integration counter 47 in FIG. 7. The compare circuit 39 in FIG. 7 determines if the present tone is equal to the previous tone. The previous tone is stored in RAM 41.

If the present tone and previous tone is not equal the RAM 41 is loaded with the present tone and thereby cleared of the previous tone. When loading the RAM 41 with the present tone the integration counter 47 is simultaneously cleared or reset.

If the present tone is equal to the previous tone the flowchart moves to computation block 380 which sets a software activity flag to denote that the tone detector 8 is sensing a valid tone and awaiting the passage of a sufficient period of time of continual sensing to insure the tone is being generated by something other than noise or some other type of interference. The activity flag of computation block 380 corresponds to the output of AND gate 33 in FIG. 4. As discussed in connection with FIG. 4, AND gate 33 will only have an active output when a detect signal from the frequency threshold filter 35, a variance good signal from comparator 31 and a A=B signal from compare circuit 39 are present at its inputs. As such the output indicates that a valid tone has been sensed and it is within the variance reference threshold, and the present valid tone is the same as the last received valid tone.

In computation block 390 in FIG. 12b the integration counter is incremented so as to indicate the valid tone has continued to be present at the tone detector 8 input for some predetermined amount of time. The software integration counter referenced in computation block 39 corresponds by analogy to the hardware integration counter 47 in FIG. 7. After the integration counter has been incremented in computation block 390 the flowchart moves to decision block 400 which looks to see if the integration counter has reached or exceeded its threshold value. If it has not, the flowchart returns to the wait for next interrupt block 210. If the threshold has been reached or exceeded the flowchart moves to a detect block 410. Decision block 400 which looks to see if the integration counter has reached or exceeded its threshold value. If it has not, the flowchart returns to the wait for next interrupt block 210. If the threshold has been reached or exceeded the flowchart moves to a detect block 410. Decision block 400 and detect block 410 correspond by analogy to the compare circuit 45 in FIG. 7. As discussed in connection with FIG. 7, the integration threshold compare circuit 45 compares the output of integration counter 47 with the output of threshold storage 49 and determines if the integration counter 47 output is equal to or greater than the value stored in threshold storage 49. For each tone there is a different time value to which the integration counter 47 must count up to before the integration threshold compare circuit 45 will issue a detect signal. Therefore the threshold storage 49 acts as a look up table for time periods corresponding to each of the valid tones. After the tone detector 8 has reached the detect block 410 it returns to the wait-for-next interrupt block 210 to start the decoding process again in response to the next interrupt.

C. The Limiter

FIG. 13 is a detailed component schematic of the limiter circuit 6 in FIG. 3. A positive peak detector 600 is composed of a operational amplifier 605, a diode D1 and a capacitor C1. The negative peak detector 610 is composed of a operational amplifier 615, a diode D2, and a capacitor C2. The value of capacitors C1 and C2 are related to the frequency at the limiter input since the discharge time of the capacitors needs to be considerably longer than the frequency period of the input signal.

A resistive series connected network R1, R2 and R3 compose the weighted average circuit 620. The outputs of the two peak detectors are connected at the two ends of the series connected resistive network R1, R2 and R3. Two voltages within this resistive network are chosen as inputs to the analog switch 625. The first voltage is taken between R1 and R2, while the second voltage is taken between R2 and R3. The resistive ladder R1, R2 and R3 serve a dual purpose. They provide a discharge path for capacitors C1 and C2 so that if the input signal is removed capacitors C1 and C2 will tend to discharge toward the average of their two previous values. More importantly though, the resistive ladder R1, R2 and R3 generate the two referenced voltages inputed to the analog switch 625.

$$V_D = V_C + \frac{[V_B - V_C][R2 + R3]}{[R1 + R2 + R3]}$$

$$V_E = V_C + \frac{[V_B - V_C][R3]}{[R1 + R2 + R3]}$$

For representative values $R1 = R3 = 3900$ ohms $$R2 = 390 \text{ ohms}$$

$$V_D = V_C + [V_B - V_C]*52.4\%$$

conversely $$V_E = V_C + [V_B - V_C]*47.6\%$$

Note that $V_D$ (voltage D in FIG. 13) is 2.4% higher than the midpoint between $V_C$ (voltage C in FIG. 13) and $V_B$ (voltage B in FIG. 13) while $V_E$ (voltage E in FIG. 13) is 2.4% lower than the midpoint. These two voltages ($V_D$ and $V_E$) are used to establish a 4.8% total hysteresis for the voltage comparator 630. For a rough estimate, the hysteresis of the limiter can be determined by the equation;

$$\% \text{ HYSTERESIS} = \frac{R2}{R1 + R2} \times 100$$

Resistors R4 and R5 provide a small additional amount of hysteresis by way of positive feedback for comparator 630. The positive feedback provides fixed hysteresis. This prevents the hysteresis from going to zero when the input signal level goes below the minimum desired dynamic range limit. The fixed hysteresis ensures the limiter will be stable at low input conditions since the fixed hysteresis voltage becomes a increasingly larger percentage of the input voltage as the input voltage decreases in magnitude to a point outside the 50 db dynamic range of the limiter.

The hysteresis voltage F is generated by alternately selecting voltage D or E depending on the state of the comparator output G. Capacitor C3 ensures that the voltage transition between $V_D$ and $V_E$ occurs without switching transcients. Analog switch 625 can comprise a pair of transmission gates 625A and 625B as shown in FIG. 13. But the analog switch 625 is preferably a MC14053B chip. The analog switch is used as a single pole double toggle switch. The output of comparator 630 provides the control input for the transmission gates 625A and 625B. When the output of comparator 630 is high then the transmission gate 625B connects the negative peak detector voltage E output to the negative input of comparator 630. A high input to the control input of transmission gate 625A holds the gate in a off condition. Accordingly, if the output of the comparator 630 is low than the output D of positive peak detector 600 passes through transmission gate 625A and into the negative input of comparator 630. The amount of shift in the threshold voltage at the negative input of comparator 630, caused by the switching between voltage D and E, is a percentage fraction of the input signal A.

What is claimed is:

1. A decoder for receiving and decoding a series of coded messages wherein a first amplitude of a particular frequency ends a first coded message and a second amplitude of said particular frequency begins a second coded message, said decoder comprising, receiver means for receiving said coded message, detector means responsive to said receiver means for detecting said particular frequency, said detector means having at least first and second states, wherein said detector means can detect said first and second amplitudes of said particular frequency in said first state and said second amplitude of said particular frequency in said second state, sensor means responsive to said receiver means for detecting a threshold amplitude of said coded message, control means responsive to said detector means and said sensor means to control the state of said detector means, function means response to said receiver means and enabled by said control means, said control means being responsive to detection of said first amplitude of said particular frequency by said detector means to hold said function means in an enabled condition, said control means also being responsive to detection of a threshold amplitude by said sensor means to change said detector means from said first state to said second state thus allowing said detector means to detect said second amplitude of said particular frequency, said control means disabling said function means in response to a detection of said second amplitude of said particular frequency by said detector means in said second state.

2. A decoder according to claim 1 wherein said control means returns said detector means to said first state and keeps said function means enabled if said detector means fails to detect said second amplitude of said particular frequency while in said second state.

3. A decoder according to claim 1 wherein said detector means comprises,
a tone detector,
a filter, and
a switch means.

4. A decoder according to claim 3 wherein said tone detector has a first quality factor state and a second quality factor state, said first state of said detector means corresponding to said first quality factor state of said tone detector and said second state of said detector means corresponding to said second quality factor state of said tone detector.

5. A decoder according to claim 3 wherein said switch means, in response to said control means, alternately chooses the output of said filter or said receiving means as the input to said tone detector.

6. A decoder according to claim 5 wherein said switch means chooses the output of said receiver means in response to said control means when said control means changes said detector means from said first state to said second state.

7. A decoder according to claim 1 further including,
a notch filter responsive to said receiver means to strip said second amplitude of said particular frequency from an audio voice signal mixed with said particular frequency,
said function means being a transmitter response to said notch filter and said control means to transmit said audio voice signal when said transmitter is enabled by said control means.

8. A decoder according to claim 3 wherein said tone detector comprises,
a limiter means responsive to said switch means
a variance means responsive to said limiter means for calculating the average period variance of a portion of said coded signal, said variance means indicating to said control means a detection of said particular frequency when said average period variance is within predetermined parameters.

9. A method for detecting and decoding a coded signal including first and second messages, wherein a first amplitude of a first frequency is associated with a first coded message, and a second amplitude of said first frequency is associated with a second coded message, said method comprising the steps of,
a. decoding a first amplitude of a first frequency of said first message, while simultaneously monitoring the amplitude of said coded signal,
b. detecting the crossing of a threshold amplitude by said coded signal,
c. determining if the frequency of the portion of said coded signal crossing said threshold amplitude is equal to said first frequency,
d. decoding said second message if step (c) determination is positive, and
e. returning to decoding a first amplitude of a first frequency of said first message if the step (c) determination is negative.

10. A method for detecting and decoding a coded signal according to claim 9, said method including the step of,
(f) decoding a second frequency after decoding a second amplitude of said first frequency,
(g) keying or dekeying a transmitter in response to said second frequency.

11. A method for detecting and decoding a coded signal according to claim 9, said method including the step of,
f. decoding said coded signal by calculating the average period variance of a portion of said coded signal indicating detection of said first frequency when said average period variance is within predetermined parameters.

12. A decoder for receiving and decoding a series of coded messages from a remote terminal wherein a first amplitude of a first frequency is associated with a first coded message and a second amplitude of a first frequency followed by a second frequency is associated with second coded message, said decoder comprising;
a receiver means for receiving said series of coded messages,
frequency detection means responsive to said receiver means to detect said first and second amplitudes of said first frequency and said second frequency,
control means responsive to said frequency detection means detection of said first and second amplitudes of said first frequency,
function means enabled and disabled by said control means,
said control means holding said function means in an enabled condition in response to detection of said first amplitude of said first frequency by said frequency detection means,
said control means responding to the simultaneous detection of said first and second amplitude of said first frequency by said frequency detection means to become responsive to detection of said second frequency by said frequency detection means,
said control means disabling said function means in response to detection of said second frequency by said frequency detection means.

13. A decoder according to claim 12 wherein said frequency detection means includes a amplitude detection means which detects a threshold amplitude in said series of coded messages and a detector means which detects said first frequency and said second frequency.

14. A decoder according to claim 12 wherein said control means is responsive to detection of said second frequency by said frequency detection means only after said frequency detection means has detected the second amplitude of said first frequency.

* * * * *